United States Patent
Alameh et al.

(10) Patent No.: US 11,416,632 B2
(45) Date of Patent: Aug. 16, 2022

(54) METHODS, SYSTEMS, AND DEVICES FOR SEGREGATED DATA BACKUP

(71) Applicant: Motorola Mobility LLC, Chicago, IL (US)

(72) Inventors: Rachid Alameh, Crystal Lake, IL (US); Jarrett Simerson, Glenview, IL (US); Robert Witte, Algonquin, IL (US)

(73) Assignee: Motorola Mobility LLC, Chicago, IL (US)

( * ) Notice: Subject to any disclaimer, the term of this patent is extended or adjusted under 35 U.S.C. 154(b) by 79 days.

(21) Appl. No.: 16/885,024

(22) Filed: May 27, 2020

(65) Prior Publication Data
US 2021/0374269 A1 Dec. 2, 2021

(51) Int. Cl.
*G06F 21/62* (2013.01)
*G06F 21/60* (2013.01)

(52) U.S. Cl.
CPC ........ *G06F 21/6227* (2013.01); *G06F 21/602* (2013.01); *G06F 21/606* (2013.01); *G06F 2221/2107* (2013.01)

(58) Field of Classification Search
CPC .. G06F 21/6227; G06F 21/602; G06F 21/606; G06F 2221/2107
See application file for complete search history.

(56) References Cited

U.S. PATENT DOCUMENTS

| | | | | |
|---|---|---|---|---|
| 2002/0099774 | A1* | 7/2002 | Yamato | H04N 5/765 709/204 |
| 2014/0136832 | A1* | 5/2014 | Klum | G06F 21/62 713/150 |

OTHER PUBLICATIONS

"A proper mobile backup: the Acronis way", Acronis Tutorial; Unknown Publication data but prior to filing of present application; https://www.acronis.com/en-us/articles/mobile-backup/.
"Retrieve files instabtly or backup large files for $70 with Zoolz Cloud Backup", MacWorld Daily; Posted Mar. 5, 2019; https://www.macworld.com/article/3345975/retrieve-files-instantly-or-backup-large-files-for-70-with-zoolz-cloud-backup.html.

* cited by examiner

*Primary Examiner* — Ayoub Alata
(74) *Attorney, Agent, or Firm* — Philip H. Burrus, IV

(57) ABSTRACT

A method in an electronic device designates, with one or more processors of the electronic device, at least one data item stored within a memory of the electronic device for storage in a plurality of remote electronic devices. The method encrypts, with the one or more processors, the at least one data item to create at least one encrypted data item. The method divides, with the one or more processors, the at least one encrypted data item into a plurality of encrypted subset data items. The method then delivers, with a communication device, at least a first encrypted subset data item from the plurality of encrypted subset data items to a first remote electronic device and at least a second subset data item from the plurality of encrypted subset data items to a second remote electronic device.

20 Claims, 8 Drawing Sheets

METHODS, SYSTEMS, AND DEVICES FOR SEGREGATED DATA BACKUP

BACKGROUND

Technical Field

This disclosure relates generally to electronic devices, and more particularly to electronic devices configured to backup stored data to other electronic devices.

Background Art

Modern electronic devices, such as smartphones, laptop computers, and tablet computers, are capable of storing vast amounts of data. Due to increases in memory density, it is not uncommon to have devices capable of storing half a terabyte or more of information that fits into a shirt pocket. Users of such devices understand that the devices can fail, and if they do, data can be lost. There is even an acronym, "LOCKSS," that stands for "lots of copies keep stuff safe" and reminds users to routinely backup data. Many devices users, however, are reluctant to backup data to remote devices because they fear that the data may be compromised or accessed without authorization. It would be advantageous to have improved systems, methods, and devices for backing up data to remote devices while mitigating these concerns.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
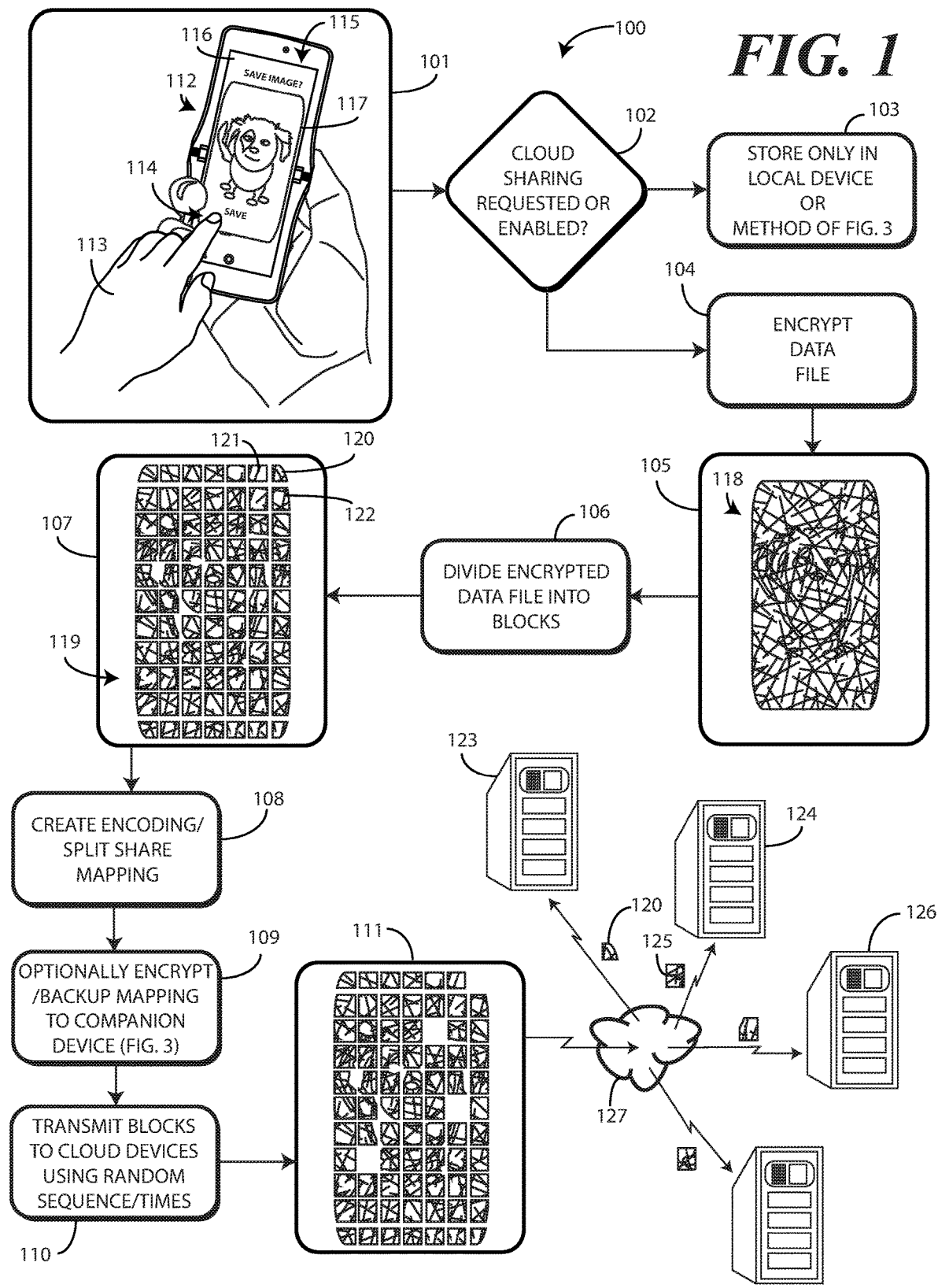
FIG. 1 illustrates one explanatory method and system in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to encrypting data items, dividing encrypted data items into encrypted subset data items, and storing the encrypted subset data items in one or more remote electronic devices. Any process descriptions or blocks in flow charts should be understood as representing modules, segments, or portions of code that include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device storage redundancy.

It will be appreciated that embodiments of the disclosure described herein may be comprised of one or more conventional processors and unique stored program instructions that control the one or more processors to implement, in conjunction with certain non-processor circuits, some, most, or all of the functions of the selection of data items to backup to remote electronic devices, encryption of at least one data item to obtain an encrypted data item, dividing the encrypted data item into a plurality of encrypted subset data items, and storing those encrypted subset data items among one or more remote electronic devices as described herein. The non-processor circuits may include, but are not limited to, a radio receiver, a radio transmitter, signal drivers, clock circuits, power source circuits, and user input devices. As such, these functions may be interpreted as steps of a method to perform the encryption of data items into encrypted data items, the division of the encrypted data items into encrypted subset data items, and the randomized storage of the various encrypted subset data items in one or more cloud servers, local companion electronic devices, or in other electronic devices.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within 1 percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide electronic devices, methods, and systems that enhance data privacy when backing up data to other electronic devices. Embodiments of the disclosure also function to alleviate user concerns regarding privacy and accessibility when data is backed up to another electronic device. With modern electronic devices, such as smartphones, now storing personal and private data, including health data, financial data, personal pictures, videos, and audio recordings, and identification data, embodiments of the disclosure contemplate that some users of these devices are reluctant to backup such data to the cloud or other devices due to the fact that the users worry that an unauthorized party will gain access to the data.

Advantageously, embodiments of the disclosure address this concern by allowing data to be backed up to external electronic devices while achieving privacy and security levels that are as high as in the primary electronic device performing the backup process. Embodiments of the disclosure thus combine the benefits of remote storage, such as cloud-based storage, while providing the same privacy and security benefits of storing data only in the hardware that remains within the possession of a user. Embodiments of the disclosure advantageously alleviate any fear of private data being accessed or revealed after a cloud-based (or other device-based) backup procedure.

In one or more embodiments, one or more processors of an electronic device encrypt the data to be backed up, break that encrypted data into blocks or chunks, and transmit these encrypted and divided blocks or chunks to other electronic devices, e.g., cloud servers, companion electronic devices, or other electronic devices, at random times. The primary device transmitting the encrypted and divided blocks or chunks maintains the knowledge of where each block or chunk is stored in a mapping. In one or more embodiments, the mapping includes time stamps indicating when the blocks or chunks were stored, how the blocks or chunks fit into the encrypted data puzzle, in which electronic device the blocks or chunks were stored, and other information. The external electronic devices storing some blocks or chunks have no knowledge of other external electronic devices storing other blocks or chunks, or no knowledge that other chunks it has received belong to each other, and this results in each storage device not knowing where any of the other chunks or blocks are stored. Any given storage device further has no knowledge of which chunks or blocks belong to a particular user due to the fact that the various chunks or blocks stored in that device arrive at different times and sometimes from different locations. Only the primary device responsible for executing the backup procedure has this knowledge in a locally stored mapping in one or more embodiments.

If any nefarious actor obtains a block or chunk without optimization, it will be of no value. Each block is encrypted, which means that the nefarious actor would need to know the encryption scheme in use and have access to the encryption key, which is stored only in the primary electronic device performing the backup procedure. Moreover, even if the nefarious actor did have the encryption key, de-encrypting a single block or chunk would not reveal the data contained within that block or chunk due to the fact that, in one or more embodiments, the encryption process is performed on the data item prior to the division into blocks or chunks. Accordingly, any blocks or chunks that are independently decrypted will not return to their original state due to the fact that their encryption is dependent upon the encryption of neighboring blocks. Accordingly, decryption of independent blocks or chunks reveals no data due to the fact that the other blocks are in other electronic devices.

In one or more embodiments, one or more processors of an electronic device designate at least one data item stored within a memory of the electronic device for storage in a one or more electronic devices. Thereafter, the one or more processors encrypt the at least one data item to create at least one encrypted data item. The one or more processors then divide the at least one encrypted data item into a plurality of encrypted subset data items. The one or more processors then deliver, with a communication device of the electronic device, at least a first encrypted subset data item from the plurality of encrypted subset data items to a first remote electronic device and at least a second encrypted subset data item from the plurality of encrypted subset data item to a second remote electronic device. In one or more embodiments, the first encrypted subset data item and the second encrypted subset data item are different encrypted subset data items, and are delivered at different times. The times, as well as the remote electronic devices to which the encrypted subset data items are delivered, are optionally chosen randomly.

Any decryption of the first encrypted subset data item or second encrypted subset data item, standing alone, reveals no data because the other encrypted subset data items are stored elsewhere and decryption of one encrypted subset data item is not possible without first reassembling the plurality of encrypted subset data items. Said differently, in one or more embodiments de-encryption of the at least one encrypted data item requires all encrypted subset data items of the plurality of encrypted subset data items to reveal data in the at least one encrypted data item.

In one or more embodiments, the electronic device performing this backup procedure maintains a mapping of the plurality of encrypted subset data items so that retrieval of the encrypted subset data items, assembly of the encrypted subset data items into the encrypted data item, and de-encryption of the encrypted data item can be performed to obtain the data item. In one or more embodiments, the mapping of the encrypted subset data items includes at least an identification of the mode of encryption used to encrypt the at least one encrypted data item, an identifier of the first remote electronic device to which the first encrypted subset data item was stored, an identifier of the second remote electronic device where the second encrypted subset data item was stored, and a time stamp indicating when the first encrypted subset data item and the second encrypted subset data item were transmitted to the first remote electronic device and second remote electronic device, respectively. Other information can be stored in the mapping as well, as will be obvious to those of ordinary skill in the art having the benefit of this disclosure.

When the primary electronic device wants to restore the data item from the remote electronic devices, the one or more processors of the electronic device employ the mapping to selectively retrieve and reassemble each encrypted subset data item into the encrypted data item. Since the one or more processors sent the various encrypted subset data items to different remote electronic devices at different times, the mapping provides the instructional set for the one or more processors to retrieve the same. In one or more embodiments, this mapping is stored only in the electronic device performing the backup operation. In other embodiments, the mapping can be selectively stored—even using the same encrypt, divide, and randomly distribute method used with the encrypted data item—on companion electronic devices or other remote electronic devices.

Accordingly, using the mapping, the one or more processors can retrieve, with the communication device, the first encrypted subset data item from the first remote electronic device, the second encrypted subset data item from the second remote electronic device, and so forth, and reassemble these encrypted subset data items into the encrypted data item. In one or more embodiments, the one or more processors assemble, using the mapping of the plurality of encrypted subset data items, the various encrypted subset data items to form the encrypted data item. The one or more processors can then de-encrypt the encrypted data item to obtain the at least one data item, and can store the at least one data item in the memory of the electronic device to complete the restore process.

If an intruder or other malfeasant accesses one of the remote electronic devices in which the encrypted subset data items are stored, this will not reveal any data content. This is true because each remote electronic device adds a piece of the puzzle, with the encrypted data item only being capable of de-encryption when all encrypted subset data items of the plurality of encrypted subset data items are retrieved. Since the encrypted data item was encrypted before division, de-encryption of one or more encrypted subset data items, without first having all the encrypted subset data items, reveals nothing. Since remote electronic device A gets only a portion of the encrypted subset data items, with remote electronic device B, C, D, and so forth getting other portions of the encrypted subset data items at different times, there is no association within any one remote electronic device between encrypted subset data items. Only the primary electronic device understands, via the mapping, where the pieces are stored.

To illustrate by example, presume a data item is a photograph. In one or more embodiments, this photograph is encrypted to create an encrypted data item. The encrypted data item is then divided, perhaps into four pieces. No single piece, two pieces, or even three pieces are capable of de-encryption. Four pieces, assembled together, are required for de-encryption to reveal the photograph. The electronic device, in which the photograph is stored, i.e., the primary electronic device performing the backup process, sends the four pieces to four cloud servers, with each cloud server getting a different piece at a different time. Only the primary electronic device understands, via the mapping, where the pieces are stored. If an authorized user of the primary electronic device requires the picture, the one or more processors of the primary electronic device retrieve the four pieces, reassemble them to form the encrypted data item, and de-encrypt the encrypted data item to reveal the picture.

Advantageously, when users of embodiments of the disclosure understand that their data items are randomized and split between various remote electronic devices that are identifiable only by the authorized user's personal electronic device, the authorized user feels more secure about the security and privacy of storing data outside of the primary electronic device. Other advantages offered by embodiments of the disclosure will be described below. Still others will be obvious to those of ordinary skill in the art having the benefit of this disclosure.

In other embodiments, rather than sending encrypted subset data items to unknown remote electronic devices, the primary electronic device performs backup operations only with companion electronic device, e.g., electronic devices with which the primary electronic device has been paired. In one or more embodiments, the companion electronic device (s) is required to be operating on a common local area network for the process to proceed. In other embodiments, the companion electronic device(s) are required to be in the same physical location, the same known location, e.g., the home or residence of the authorized user of the primary electronic device, within a predefined distance of the primary electronic device, and so forth.

Turning now to FIG. 1, illustrated therein is one explanatory method 100 in accordance with one or more embodiments of the disclosure. Beginning at step 101, an authorized user 113 of an electronic device 112 is delivering user input 114 to a user interface 115 of the electronic device 700, here a touch-sensitive display 116, requesting for a data item 117, here a picture of the authorized user's dog, Buster, to be saved and backed up to at least one electronic device other than the electronic device 112 of step 101. The authorized user 113 understands the acronym "LOCKSS" and it's associated meaning, i.e., lots of copies keep stuff safe. Accordingly the authorized user 113 wants to ensure the picture is stored not only in the electronic device 112, but also in at least one other electronic device as well. Accordingly, at step 101 one or more processors of the electronic device 112 designate the data item, which is stored in a memory of the electronic device, for storage in at least one remote electronic device as well.

At decision 102, the one or more processors of the electronic device 112 determine whether the sharing of data items from the electronic device 112 to remote servers, such as servers in the "cloud" is enabled. Embodiments of the disclosure provide systems, methods, and devices capable of storing data items in both cloud-based systems and companion-device systems. Accordingly, in one or more embodiments the one or more processors of the electronic device 112 determine, at decision 102, whether the former is enabled. In one or more embodiments the decision to enable cloud-based data item backup is user-definable and is configurable using one or more settings in a menu.

In this illustrative example, the cloud-based data storage option is enabled. Had it not been, i.e., had the authorized user 113 preferred for the backup storage to be only with a companion electronic device of the electronic device 112, the method 100 would proceed to step 103. The details of the method steps associated with step 103 are described below with reference to FIG. 3.

Since the authorized user 113 has configured the electronic device 112 for data storage in non-companion electronic devices such as cloud servers, the method 100 proceeds to step 104. In one or more embodiments, the one or more processors encrypt the at least one data item 117 at step 104 to obtain at least one encrypted data item 118, which is shown at step 105. Embodiments of the disclosure contemplate that the one or more processors of the electronic device 112 can encrypt the data item 117 in a variety of ways.

For example, in one or more embodiments the data item 117 is encrypted with a seed, which can be generated as a random number by the one or more processors. The one or more processors of the electronic device 112 can be equipped with a true random number generator that generates a random number that forms the basis of the seed. As used herein, a "seed" refers to the random number that is used as the basis for encryption. Since the hardware generates a truly random number in one or more embodiments, the seed becomes a function of this random number.

In one or more embodiments, the one or more processors of the electronic device 112 employ an encryption key to encode the data item 117 to obtain the encrypted data item 118. Encryption keys are used so that so that only devices having the key can decode the encrypted data item 118. In one or more embodiments, the one or more processors employ a "cipher" that encrypts the data item 117 using the encryption key to obtain the encrypted data item 118. For all practical purposes, decryption of the encrypted data item 118 is impossible without the encryption key. In other embodiments, the one or more processors create a random encryption key by using a random number generator as a seed. Accordingly, to decrypt the encrypted data item 118, a device must have access to the seed so that the encryption key can be obtained. Access to the seed allows a random number generator matching the encryptor to generate matching encryption keys, thereby de-encrypting the encrypted data item 118.

In one or more embodiments, the encryption key used by the one or more processors can be a function of multiple factors. For example, in one or more embodiments the authorized user 113 can personalize the seed when the one or more processors combine other data received as user input 114 to generate the encryption key. In one or more embodiments, the one or more processors of the electronic device 112 employ data representations corresponding to unique characteristics of the authorized user 113 to create the encryption key. Examples of such characteristics include fingerprint, iris features, facial shape, skin tone, hair color, eye color, facial mapping in three dimensions, iris scans, voice profile, and other factors. In addition to these unique characteristics, one or more embodiments of the disclosure employ non-biometric information, such as a personal identification number (PIN), a user's location, and so forth to create the encryption key. Thus, embodiments of the disclosure require not only access to the seed, but that a particular authorized user 113 both be biometrically authenticated and deliver a second authentication factor to the user interface 115 of the electronic device 112 prior to any de-encryption of the encrypted data item 118. Any of these encryption techniques can be employed at step 104. Other encryption techniques can be used as well, as numerous other encryption techniques suitable for use at step 104 will be obvious to those of ordinary skill in the art having the benefit of this disclosure.

At step 106, the one or more processors of the electronic device 112 divide the encrypted data item 118 to obtain a plurality of encrypted subset data items 119, which are shown at step 107. Since the encrypted data item 118 is divided into the plurality of encrypted subset data items 119 after the encryption occurring at step 104, de-encryption of any one encrypted subset data item, e.g., encrypted subset data item 120 will not reveal any recognizable information of the original data item 117.

Advantageously, if any nefarious actor obtains a one or more encrypted subset data items, without having every single encrypted subset data item of the plurality of encrypted subset data items 119, it will be of no value. Each encrypted subset data item 120 is encrypted, which means that the nefarious actor would need to know the encryption scheme in use and have access to the encryption key, which is stored only in electronic device 112. If the encryption key is a function of data representations corresponding to unique characteristics of the authorized user 113, such as a fingerprint, iris features, facial shape, skin tone, hair color, eye color, facial mapping in three dimensions, iris scans, or voice profile, non-biometric information, such as a personal identification number (PIN) or a user's location, this information would be required to the encryption key as well. Since a nefarious actor not having access to the electronic device 112 or the authorized user 113 would be unlikely to have the encryption key, the encryption of the encrypted subset data item 120 would be secured.

More importantly, however, and on a more basic level, even if the nefarious actor did have the encryption key, de-encrypting a single encrypted subset data item 120 would not reveal the data contained within that encrypted subset data item 120 due to the fact that the encryption process, step 104, is performed on the data item 117 prior to the division into the plurality of encrypted subset data items 119 occurring at step 109. Accordingly, any encrypted subset data item 120 that is independently de-encrypted will not reveal that portion's data of the data item 117 due to the fact that its encryption is dependent upon the encryption of neighboring encrypted subset data item, e.g., encrypted subset data item 121 and encrypted subset data item 122. Accordingly, de-encryption of independent encrypted subset data items 120, 121,122 reveals no data from the data item 117 due to the fact that all encrypted subset data items of the plurality of encrypted subset data items 119 have not been reassembled prior to than de-encryption attempt. This layer of security is in addition to the fact that any nefarious actor is unlikely to have the encryption key, as noted above.

At step 108, in one or more embodiments the one or more processors of the electronic device 112 create a mapping of the plurality of encrypted subset data items 119 for storage in a memory of the electronic device 112. At step 108, the mapping includes preliminary information. More information will be added to the mapping created at step 108 as the method 100 proceeds. In one or more embodiments, when the mapping is in an initial stage, it includes identifiers associated with teach encrypted subset data item 120,121, 122, of the plurality of encrypted subset data items 119. The mapping can also include an identification of the mode of encryption used to encrypt the plurality of encrypted subset data items 119. As will be explained in more detail below, creating the mapping at step 108 will provide information the one or more processors of the electronic device 112 can use both in storing the plurality of encrypted subset data items 119 in remote electronic devices, and in restoring the data item 117 by retrieving the plurality of encrypted subset data items 119 from the remote electronic devices.

Figure 5:
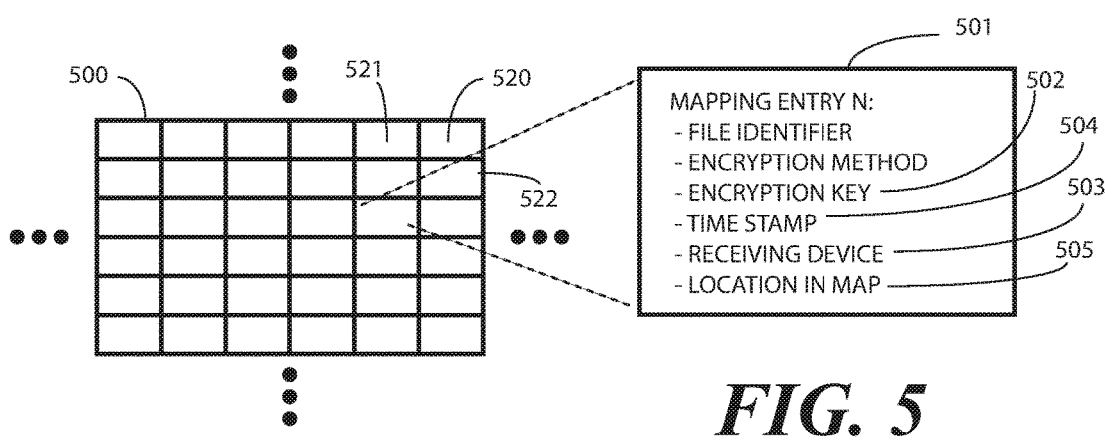
FIG. 5 illustrates one explanatory mapping of encrypted subset data items in accordance with one or more embodiments of the disclosure.

Turning briefly to FIG. 5, illustrated therein is one explanatory mapping 500 in accordance with one or more embodiments of the disclosure. Since the one or more processors of the electronic device (112) are operable to deliver the various encrypted subset data items (120,121, 122) to different remote electronic devices (123,124,126) at different times, the mapping 500 provides the instructional set for the one or more processors to retrieve the same. In one or more embodiments, this mapping 500 is stored only in the electronic device (112) performing the backup operation. In other embodiments, the mapping 500 can be selectively stored—even using the same encrypt, divide, and randomly distribute method used with the encrypted data item—on companion electronic devices or other remote electronic devices.

As shown in FIG. 5, the mapping 500 includes an entry 520,521,522 for each encrypted subset data item (120,121, 122) of the plurality of encrypted subset data items (119) from FIG. 1. Each entry 520,521,522 comprises information relating to how the encrypted subset data items (120,121, 122) of the plurality of encrypted subset data items (119) relate to each other for re-assembly of the encrypted subset data items (120,121,122), where the encrypted subset data items (120,121,122) of the plurality of encrypted subset data items (119) are stored, i.e., in which remote electronic devices (123,124,126) the encrypted subset data items (120, 121,122) of the plurality of encrypted subset data items (119) are stored, and optionally information identifying how the encrypted subset data items (120,121,122) of the plurality of encrypted subset data items (119) are encrypted. For example, as shown at entry 501, in one or more embodiments the mapping 500 of the plurality of encrypted subset data items (119) identifies a mode of encryption 502 used to encrypt the encrypted subset data items (120,121,122) of the plurality of encrypted subset data items (119) and an identifier 503 of the remote electronic devices (123,124,126) where the encrypted subset data items (120,121,122) of the plurality of encrypted subset data items (119) are stored. The identifier 503 for entry 520 may indicate, for example, the first remote electronic device (123) where the at least a first encrypted subset data item (120) is stored. The identifier 503 for different entry may identify the second remote electronic device (124) where the at least a second encrypted subset data (125) item is stored, and so forth. Other information can be stored in the mapping as well, as will be obvious to those of ordinary skill in the art having the benefit of this disclosure.

In one or more embodiments, the mapping 500 includes timestamps 504 indicating when the encrypted subset data items (120,121,122) of the plurality of encrypted subset data items (119) were stored, information 505 regarding how the encrypted subset data items (120,121,122) of the plurality of encrypted subset data items (119) fit into the encrypted data item (118), and other information. The external electronic devices storing some encrypted subset data items (120) of the plurality of encrypted subset data items (119) have no knowledge of other external electronic devices storing other encrypted subset data items (125) of the plurality of encrypted subset data items (119), and this results in each storage device not knowing where any of the other encrypted subset data items (121,122) of the plurality of encrypted subset data items (119) are stored. Any given storage device further has no knowledge of which encrypted subset data items (120,121,122) of the plurality of encrypted subset data items (119) belong to a particular authorized user (113) due to the fact that the various encrypted subset data items (120,121,122) of the plurality of encrypted subset data items (119) arrive at different times and sometimes from different locations. Only the electronic device (112), in the method (100) of FIG. 1, or alternatively the electronic device (112) and one or more companion electronic devices, in the method of FIG. 3, have this knowledge in the mapping 500, which is locally stored in one or more embodiments.

Maintaining the mapping 500 in memory allows for retrieval of the encrypted subset data items (120,121,122) of the plurality of encrypted subset data items (119), assembly of the encrypted subset data items (120,121,122) of the plurality of encrypted subset data items (119) into the encrypted data item (118), and de-encryption of the encrypted data item (118) to obtain the data item (117). When electronic device (112) wants to restore the data item (117) from the remote electronic devices (123,124,126), the one or more processors of the electronic device (112) employ the mapping 500 to selectively retrieve and reassemble each encrypted subset data item (120,121,122) of the plurality of encrypted subset data items (119) into the encrypted data item (118). Since the one or more processors sent the various encrypted subset data items (120,121,122) of the plurality of encrypted subset data items (119) to different remote electronic devices (123,124,126) at different times, the mapping 500 provides the instructional set for the one or more processors to retrieve the same. In one or more embodiments, this mapping 500 is stored only in the electronic device (112) performing the backup operation. In other embodiments, the mapping 500 can be selectively stored—even using the same encrypt, divide, and randomly distribute method used with the encrypted data item—on companion devices or other remote electronic devices.

Accordingly, using the mapping 500, the one or more processors can retrieve, with the communication device, the first encrypted subset data item (120) from the first remote electronic device (123), the second encrypted subset data item (125) from the second remote electronic device (124), and so forth, and reassemble these encrypted subset data items (120,121,122) of the plurality of encrypted subset data items (119) into the encrypted data item (118). In one or more embodiments, the one or more processors assemble, using the mapping 500, the various encrypted subset data items (120,121,122) of the plurality of encrypted subset data items (119) to form the encrypted data item (118). The one or more processors can then de-encrypt the encrypted data item (118) to obtain the at least one data item (117), and can store the at least one data item in the memory of the electronic device (112) to complete the restore process.

Turning now back to FIG. 1, at optional step 109, the one or more processors of the electronic device 112 can share and/or backup the mapping (500) created at step 108 with one or more companion electronic devices. In one embodiment, the one or more processors will store the mapping (500) created at step 108 only in the memory of the electronic device 112. However, in other embodiments, the one or more processors of the electronic device 112 will share the mapping (500) created at step 108 with one or more companion electronic devices authenticated to the authorized user 113.

As used herein, a "companion" electronic device is an electronic device that has been securely connected to the electronic device 112 by the authorized user 113 of the electronic device. Illustrating by example, in one or more embodiments a companion electronic device comprises electronic devices with which the primary electronic device, here electronic device 112, has been paired. In other embodiments, a companion electronic device is an electronic device that has been sufficiently connected, associated, linked, or otherwise related to the electronic device 112.

For instance, another electronic device may be a companion electronic device if the electronic device 112 and the other electronic device have a previous engagement history, which may include frequent device-to-device communications, communications through a common electronic device such as a router or Internet-of-things device, or if the electronic device 112 and the other electronic device have been paired with secure communication channels as securely-linked companion electronic devices. In other embodiments, the companion electronic device comprises an electronic device with which the electronic device 112 has previously established communication and that are operating on a common local area network. In still other embodiments, to be a companion electronic device another electronic device is required to be in the same physical location as the electronic device 112. In still more embodiments, another electronic device must be in the same known location, e.g., the home or residence of the authorized user 113 of the electronic device 112 to be a companion electronic device. In other embodiments, another electronic device must be within a predefined distance of the electronic device 112 to be a companion electronic device. Other examples of companion electronic devices will be obvious to those of ordinary skill in the art having the benefit of this disclosure.

Where the one or more processors of the electronic device 112 opt, at step 109, to backup the mapping (500) created at step 108 in a companion electronic device, in one or more embodiments the one or more processors use the method of FIG. 1, which includes the one or more processors selecting the mapping (500) for storage in the companion electronic device, encrypting the mapping (500) to create an encrypted mapping data item, dividing the encrypted mapping data item to create a plurality of encrypted mapping subset data items, and causing the communication device to transmit at least a first encrypted mapping subset data item from the plurality of encrypted mapping subset data items and at least a second encrypted mapping subset data item from the plurality of encrypted mapping subset data items to the companion electronic device. In one or more embodiments, the times at which the various encrypted mapping subset data items are transmitted to the companion electronic device can be randomized. Using such a process at step 109, the companion electronic device will not be able to access the mapping (500). As the one or more processors update the mapping (500) while performing the subsequent steps of the method 100 of FIG. 1, the process occurring at step 109 can be repeated in one or more embodiments. In other embodiments, the one or more processors may elect to wait to perform step 109 at the end of the method 100 of FIG. 1.

In other embodiments, the one or more processors of the electronic device 700 will simply transmit the mapping (500) created at step 108 to the companion electronic device at step 109. Embodiments of the disclosure contemplate that the authorized user 113 may wish to have their tablet computer and laptop computer, for example, to have access to data items 117 stored by the electronic device 112 in remote electronic devices. In such situations, each companion electronic device would need a copy of the mapping (500) as well. In this embodiment, as the one or more processors update the mapping (500) while performing the subsequent steps of the method 100 of FIG. 1, the process occurring at step 109 can be repeated in one or more embodiments. In other embodiments, the one or more processors may elect to wait to perform step 109 at the end of the method 100 of FIG. 1.

At step 110, the one or more processors of the electronic device 112 deliver, with a communication device of the electronic device 112, at least a first encrypted subset data item 120 from the plurality of encrypted subset data items 119 to a first remote electronic device 123 and at least a second subset data item 125 from the plurality of encrypted subset data items 119 to a second remote electronic device 124, where the at least a first encrypted subset data item 120 and the at least a second subset encrypted data item 125 are different subset encrypted data items of the plurality of encrypted subset data items 119. In the illustrative embodiment of FIG. 1, the first remote electronic device 123 and the second remote electronic device 124 are different remote electronic devices. However, in other embodiments the one or more processors of the electronic device 112 will transmit, at step 110, at least the first encrypted subset data item 120 from the plurality of encrypted subset data items 119 and at least the second subset data item 125 from the plurality of encrypted subset data items 119 to a single remote electronic device, e.g., remote electronic device 126, albeit at different times. In either case, since the encrypted subset data items 120,125 arrive at different times, the receiving remote electronic device does not have knowledge that the different encrypted subset data items 120.125 are related.

In this illustrative embodiment, each remote electronic device 123,124,126 comprises a cloud server in communication with the electronic device 112 across a network 127. In one or more embodiments, the one or more processors of the electronic device 112 deliver, at step 110, the at least a first encrypted subset data item 120 from the plurality of encrypted subset data items 119 to the first remote electronic device 123 and the at least a second subset data item 125 from the plurality of encrypted subset data items 119 to the second remote electronic device 124 at different times. For example, in one or more embodiments the one or more processors of the electronic device 112 select, at step 110, the times at which the at least a first encrypted subset data item 120 from the plurality of encrypted subset data items 119 is delivered to the first remote electronic device 123 and the at least a second subset data item 125 from the plurality of encrypted subset data items 119 is delivered to the second remote electronic device 124 randomly.

This random delivery of the at least a first encrypted subset data item 120 and the at least a second encrypted subset data item 125 to the first remote electronic device 123 and the second remote electronic device 124, respectively, advantageously results in the first remote electronic device 123 and the second remote electronic device 124 having no information regarding where the remaining encrypted subset data items of the plurality of encrypted subset data items 119 are stored. Said differently, the first remote electronic device 123 does not know where the rest of the encrypted subset data items are stored data or what other remote electronic devices 124,126 are included in receiving encrypted subset data items from the plurality of encrypted subset data items 119 since they arrive at different times and perhaps locations.

Instead, only the one or more processors of the electronic device 112, by updating the mapping (500) created at step 108, understand where each encrypted subset data item of the plurality of encrypted subset data items 119 is stored. Accordingly, in one or more embodiments when the one or more processors transmit the encrypted subset data items at step 110, they update the mapping (500) created at step 108 with additional information. Illustrating by example, in one or more embodiments the mapping (500) created at step 108 includes, after the updating occurring at step 110, an identification of a mode of encryption used to encrypt the at least one encrypted data item 120, an identifier of the first remote electronic device 123 where the at least a first encrypted subset data item 120 is stored, an identifier of the second remote electronic device 124 where the at least a second encrypted subset data item 125 is stored, and so forth, for each encrypted subset data item of the plurality of encrypted subset data items 119. The mapping (500) can also include a timestamp when each encrypted subset data item of the plurality of encrypted subset data items is stored. Other information suitable for storing in the mapping (500) will be obvious to those of ordinary skill in the art having the benefit of this disclosure.

As shown at step 111, the delivery of step 110 results in the various encrypted subset data items of the plurality of encrypted subset data items 119 being delivered to remote electronic devices 123,124,126 until each has been so delivered. In one or more embodiments, this delivery occurs at random times. As noted above, in one or more embodiments de-encryption of the plurality of encrypted subset data items 119 to reveal the data item 117 requires all encrypted subset data items of the plurality of encrypted subset data items 119. Thus, if any one remote electronic device, e.g., remote electronic device 126 attempts to de-encrypt fewer than all of the encrypted subset data items in their assembled form, no portion of the data item 117 will be revealed.

The method 100 and system of FIG. 1, advantageously, works that enhance data privacy when backing up a data item 117 from an electronic device 112 to other remote electronic devices 123,124,126. The method 100 and system also functions to alleviate concerns the authorized user 113 may have regarding privacy and accessibility when the data item 117 is backed up to the remote electronic devices 123,124,126. The method 100 and system allows the data item 117 to be backed up to external electronic devices while achieving privacy and security levels that are as high as would be the case if the data item 117 were only stored in the memory of electronic device 112. The method 100 and system combines the benefits of remote storage, such as cloud-based storage in the example of FIG. 1, while providing the same privacy and security benefits of storing data only in the hardware that remains within the possession of a authorized user 113. Embodiments of the disclosure advantageously alleviate any fear of private data being accessed or revealed after a cloud-based (or other device-based) backup procedure.

As shown and described in FIG. 1, one or more processors of an electronic device 112 encrypt the data item 117 to be backed up (step 104), break that encrypted data item 118 into a plurality of encrypted subset data items 119, and transmit these encrypted subset data items 120,125 to remote electronic devices 123,124 which in this case are cloud servers, at random times. The electronic device 112 transmitting the encrypted subset data items 120,125 maintains the knowledge of where each encrypted subset data item is stored in a mapping (500). In one or more embodiments, the mapping (500) includes timestamps indicating when the encrypted subset data items 120,125 were stored, how the encrypted subset data items 120,125 fit into the encrypted data item 118, in which remote electronic devices 123,124 the encrypted subset data items 120,125 were stored, and other information. The remote electronic devices 123,124 storing some encrypted subset data items 120,125 have no knowledge of other remote electronic devices, e.g., remote electronic device 126, storing other encrypted subset data items, and this results in each remote electronic device 123,124, 126 not knowing where any of the other encrypted subset data items are stored. Any given remote electronic device further has no knowledge of which encrypted subset data items belong to a particular electronic device 112 or authorized user 113 due to the fact that the various encrypted subset data items 120,125 stored in that remote electronic device arrive at different times and sometimes from different locations. Only the electronic device 112 responsible for executing the backup procedure has this knowledge in a locally stored mapping (500) in one or more embodiments.

Figure 2:
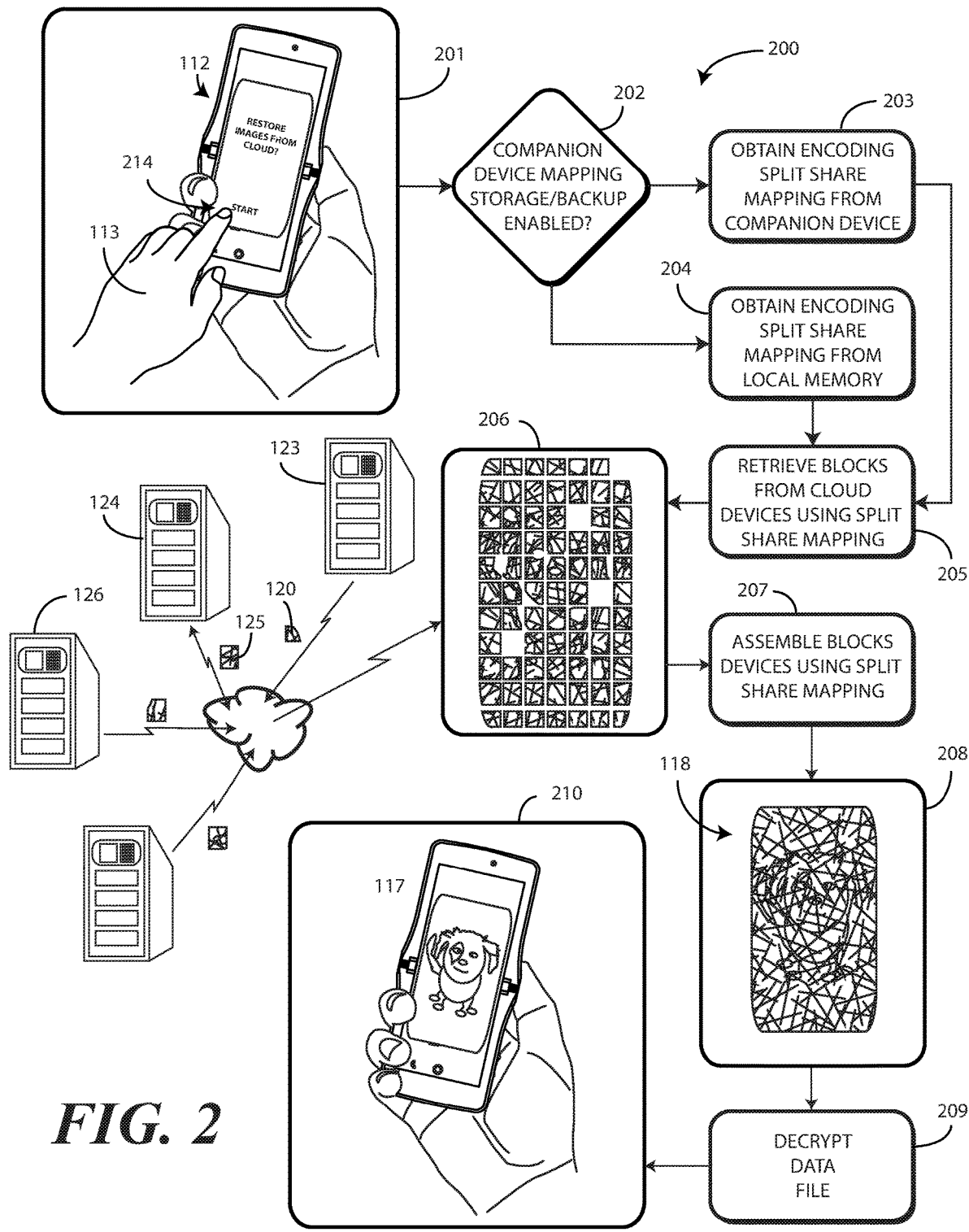
FIG. 2 illustrates another explanatory method and system in accordance with one or more embodiments of the disclosure.

Turning now to FIG. 2, illustrated therein is one explanatory method 200 of retrieving the data item 117 from the remote electronic devices 123,124,126. Beginning at step 201, the authorized user 113 is delivering user input 214 to the user interface 115 of the electronic device 112 requesting retrieval of the data item 117 stored in the remote electronic devices 123,124,126.

Decision 202 determines whether companion electronic device storage or device mapping (500) is enabled. If it is, in one or more embodiments the one or more processors of the electronic device 112 retrieve the mapping (500) from the companion electronic device. Recall from above that in one or more embodiments the mapping (500) can be stored in a companion electronic device. Where this is the case, and where the electronic device 112 receiving the user input 214 requesting retrieval of the data item 117 does not have the mapping (500) already stored in local memory, step 203 can comprise the electronic device 112 requesting the mapping (500) from a companion electronic device. Alternatively, where companion electronic device storage is not enabled, or where the electronic device 112 already has the mapping (500) stored in local memory, as is the case in FIG. 2 since the electronic device 112 creating the mapping (500) at step (109) above is the same electronic device 112 receiving the user input 214 requesting retrieval of the data item 117, step 204 comprises retrieving the mapping (500) from local and secured memory.

Step 205 then comprises retrieving, with the one or more processors of the electronic device 112, at least a first encrypted subset data item 120 of the plurality of encrypted subset data items 119 from a first remote electronic device 123. Step 205 also includes retrieving additional encrypted subset data items from other remote electronic devices, e.g., retrieving at least a second encrypted subset data item 125 from a second remote electronic device 124, until each encrypted subset data item of the plurality of encrypted subset data items 119 have been retrieved.

As shown at step 206, and as indicated at step 207, the one or more processors of the electronic device 112 then assemble, using the mapping (500) of the plurality of encrypted subset data items 119 retrieved at either step 203 or step 204, the various encrypted subset data items 120,125 to form the encrypted data item. For example, step 207 can include assembling the at least a first encrypted subset data item 120, the at least a second encrypted subset data item 125, and so forth, to assemble the encrypted data item 118, which is shown at step 208. At step 209, the one or more processors of the electronic device 112 de-encrypt the encrypted data item 118 to obtain the data item 117, which can then be presented to the authorized user 113 as shown at step 210 and/or stored in the memory of the electronic device 112.

Figure 3:
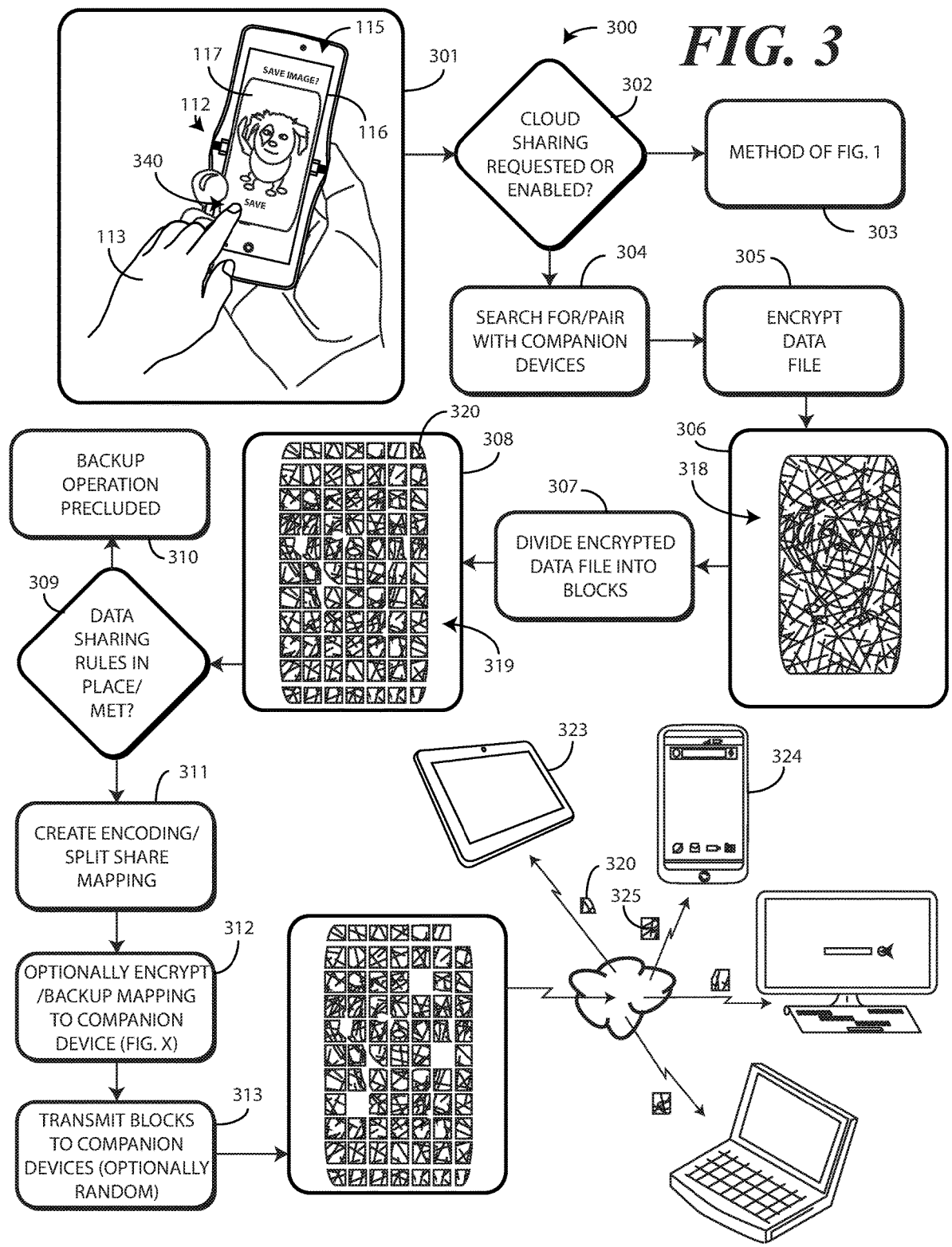
FIG. 3 illustrates still another explanatory method and system in accordance with one or more embodiments of the disclosure.

Turning now to FIG. 3, illustrated therein is another method 300 in accordance with one or more embodiments of the disclosure. In contrast to the method (100) of FIG. 1, where encrypted subset data items (120,125) were stored in remote electronic devices (123,124) in the method 300 of FIG. 3 encrypted subset data items 320,325 are stored in companion electronic devices 323,324. Embodiments of the disclosure contemplate that the authorized user 113, despite being able to avail themselves of the method (100) of FIG. 1, still may not trust unknown remote electronic devices in the cloud. Alternatively, the authorized user 113 may want to have backed up data available at all times within his electronic device 112 and companion electronic devices 323, 324.

Accordingly, in the method 300 of FIG. 3, the data item 117 to be backed up is encrypted to form an encrypted data item 318 and split into encrypted subset data items 320,325, which are delivered to companion electronic devices 323, 324 owned by the authorized user 113. In the illustrative example depicted in FIG. 3, the companion electronic devices include a tablet computer (companion electronic device 323), another smartphone (companion electronic device 324), a desktop computer, and a gaming device. Other examples of companion electronic devices will be obvious to those of ordinary skill in the art having the benefit of this disclosure.

In one or more embodiments, the mapping (500) used in executing the method 300 of FIG. 3 is also shared with each of the companion electronic devices 323,324. If the authorized user 113 happens to lose electronic device 112, and an unauthorized user attempts to decrypt the data item 117 since the electronic device 112 includes some of the encrypted subset data items, the data item 117 cannot be legibly revealed or viewed due to the fact that it requires the encrypted subset data items 320,325 stored in the companion electronic devices 323,324. Sharing the mapping (500) with the companion electronic devices 323,324 provides a redundancy that is advantageous if the electronic device 112 or one of the companion electronic devices 323,324 is permanently lost. The method 300 of FIG. 3 is therefore useful when the authorized user 113 has more than two electronic devices and one is used for a backup.

In one or more embodiments, additional security can be provided by using one or more data sharing rules for the electronic device 112 and companion electronic devices 323,324. For example, in one or more embodiments the method 300 of FIG. 3 is only permitted to proceed when the electronic device 112 and the companion electronic devices 323,324 are in close proximity, which may be determined by a near field communication circuit. In another embodiment, the method 300 of FIG. 3 is only permitted to proceed when the electronic device 112 and the companion electronic devices 323,324 are within a predefined distance, such as within a ten-foot viewable presence and/or distance for example. In still another embodiment, the method 300 of FIG. 3 is only permitted to proceed when the electronic device 112 and the companion electronic devices 323,324 are at a known, private location such as the residence of the authorized user 113, thereby adding confirmation of authenticity, or requiring that split/share location match recombine/view location.

Beginning at step 301, an authorized user 113 of an electronic device 112 is delivering user input 340 to a user interface 115 of the electronic device 700, which is the touch-sensitive display 116 in this illustrative example. At step 301, the user input 340 is requesting for a data item 117 to be saved and backed up to at least one companion electronic device 323,324. The companion electronic devices 323,324 are electronic devices belonging to the authorized user 113 and that reside at a location of residence of the authorized user 113. Rather than saving the data item 117 to the cloud, as was the case with the method (100) of FIG. 1, in FIG. 3 the authorized user 113 wants to keep the data item 117 stored only within electronic devices owned by the authorized user 113. At the same time, the authorized user 113 wants to ensure the picture is stored not only in the electronic device 112, but also in at least one other electronic device as well. Accordingly, at step 301 one or more processors of the electronic device 112 designate the data item, which is stored in a memory of the electronic device, for storage in at least one companion electronic device as well.

At decision 302, the one or more processors of the electronic device 112 determine whether the sharing of data items from the electronic device 112 to remote servers, such as servers in the "cloud" is enabled. As noted above, embodiments of the disclosure provide systems, methods, and devices capable of storing data items in both cloud-based systems and companion electronic device systems. Accordingly, in one or more embodiments the one or more processors of the electronic device 112 determine, at decision 302, whether the former is enabled. In one or more embodiments the decision to enable cloud-based data item backup is user-definable and is configurable using one or more settings in a menu of the electronic device 112.

In this illustrative example, the cloud-based data storage option is not enabled. Had it been, i.e., had the authorized user 113 preferred for the backup storage to the cloud rather than only with one or more companion electronic devices of the electronic device 112, the method 300 would proceed to step 303. The details of the method steps associated with step 303 are described above with reference to FIG. 1. Since the authorized user 113 has configured the electronic device 112 for data storage in only companion electronic devices such as tablet computers, secondary smartphones, desktop computers, gaming devices, Internet-of-things devices, etc., the method 300 proceeds to step 304.

At step 304, the one or more processors of the electronic device 112 identify, with a communication device of the electronic device 112, at least one companion electronic device 323,324 in communication with the electronic device 112. Illustrating by example, the one or more processors of the electronic device can work with the communication device to identify one or more companion electronic devices 323,324 operating within a wireless communication radius of the electronic device 112. Companion electronic devices can comprise devices that are in communication with, or alternatively are paired with using a local area network protocol such as Bluetooth.sup.™, with the electronic device 112.

In some situations, the one or more processors of the electronic device 112 will, at step 304, identify multiple companion electronic devices 323,324 operating within the wireless communication radius defined by the particular protocol with which the communication device of the electronic device 112 is communicating with the companion electronic devices 323,324. Where multiple companion electronic devices 323,324 are operating within the wireless communication radius, embodiments of the disclosure provide methods and systems for selecting between the various devices.

Illustrating by example, the one or more processors of the electronic device 112 can optionally provide an identification of the multiple companion electronic devices 323,324 at the user interface 115 of the electronic device 112. For instance, in one embodiment the one or more processors of the electronic device 112 can present a list of the multiple companion electronic devices 323,324 along the display 116, thereby allowing the authorized user 113 to select in which companion electronic devices they would like the data item 117 to be backed up. In another embodiment, the one or more processors of the electronic device 112 can deliver identification of the multiple companion electronic devices 323,324 audibly through a loudspeaker, with the authorized user 113 then delivering a voice command indicating in which companion electronic devices the data item 117 should be stored. Still other techniques for providing an identification of the multiple companion electronic devices, thereby allowing the authorized user 113 to select where the data item 117 will be stored, will be obvious to those of ordinary skill in the art having the benefit of this disclosure. In one or more embodiments, when multiple companion electronic devices 323,324 are detected, the one or more processors of the electronic device store the data item 117 in all of the companion electronic devices 323,324 in a default mode of operation.

In one or more embodiments, the one or more processors encrypt the at least one data item 117 at step 305 to obtain at least one encrypted data item 318, which is shown at step 306. As described above with reference to FIG. 1, the encryption occurring at step 305 can occur in a variety of ways. These can include using a random number that forms the basis of a seed to create a random encryption key, employing data representations corresponding to unique characteristics of the authorized user 113 to create the encryption key, employing non-biometric information to create the encryption key, a location based random number such as the home location which is private, and so forth. Other encryption techniques can be used as well, as numerous other encryption techniques suitable for use at step 305 will be obvious to those of ordinary skill in the art having the benefit of this disclosure.

At step 307, the one or more processors of the electronic device 112 divide the encrypted data item 318 to obtain a plurality of encrypted subset data items 319, which are shown at step 308. Since the encrypted data item 318 is divided into the plurality of encrypted subset data items 319 after the encryption occurring at step 305, de-encryption of any one encrypted subset data item, e.g., encrypted subset data item 320 will not reveal any recognizable information of the original data item 117, as previously described.

Figure 4:
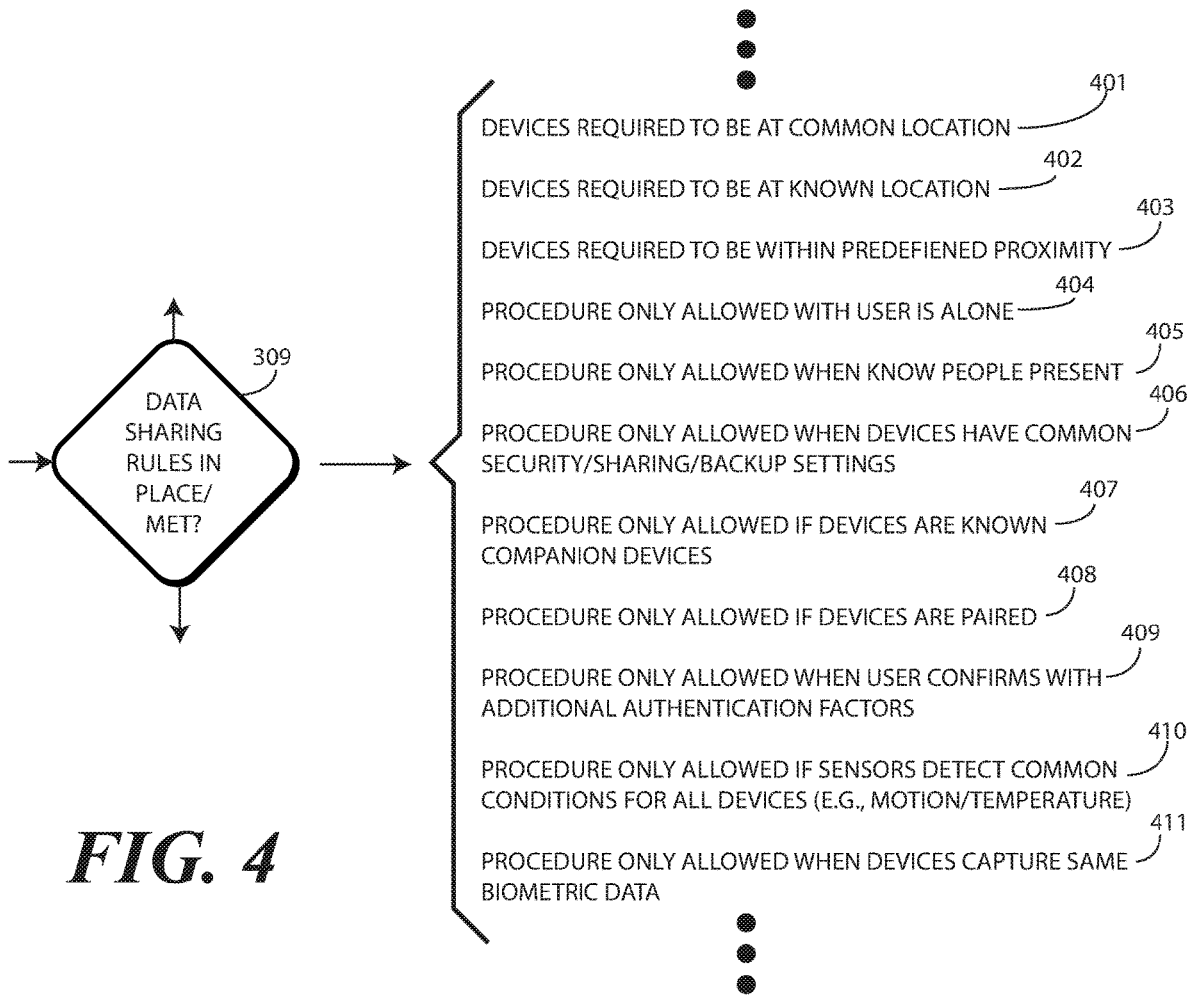
FIG. 4 illustrates one or more data sharing rules that can be used with devices, methods, and systems configured in accordance with one or more embodiments of the disclosure.

At decision 309, the one or more processors of the electronic device 112 optionally determine whether any data sharing rules are in place and/or whether those data sharing rules that are in place are met. Embodiments of the disclosure allow such data sharing rules to enhance security by only allowing backup of the data item 117 in certain situations. Turning briefly to FIG. 4, illustrated therein are a few examples.

In one or more embodiments, before an electronic device (112) can backup a data item (117) to a companion electronic device (323,324), a first data sharing rule 401 requires that the companion electronic device (323,324) must be at a common location with the electronic device (112). For example, the electronic device (112) and companion electronic device (323,324) may have to both be at work with the authorized user (113) in one or more embodiments. In other embodiments, the electronic device (112) and companion electronic device (323,324) may both have to be in a vehicle with the authorized user (113) and so forth.

In other embodiments, before an electronic device (112) can backup a data item (117) to a companion electronic device (323,324), a second data sharing rule 402 requires that the companion electronic device (323,324) and the electronic device (112) must be at known locations, which can be the same known location or different known locations. For example, the second data sharing rule 402 may require electronic device (112) to be at a first known location, e.g., the workplace of the authorized user (113), while the companion electronic device (323,324) is at another known location, e.g., the residence of the authorized user 113. In other embodiments, the electronic device (112) and companion electronic device (323,324) may both have to be in a known location, such as a restaurant where the authorized user (113) frequently dines.

In other embodiments, before an electronic device (112) can backup a data item (117) to a companion electronic device (323,324), a third data sharing rule 403 requires that the companion electronic device (323,324) and the electronic device (112) must be within a predefined distance from each other. This distance may be measured by location detectors of the devices, or alternatively may be defined by a wireless communication radius defined by the standard by which the electronic device (112) and the companion electronic device (323,324) are communicating. For example, if the electronic device (112) and the companion electronic device (323,324) are communicating using a Bluetooth.sup.™ protocol, the predefined distance may be a distance of about thirty feet as this is the distance within which the protocol can exchange electronic communications without failures. Other predefined distances suitable for use as the third data sharing rule 403 will be obvious to those of ordinary skill in the art having the benefit of this disclosure.

In other embodiments, before an electronic device (112) can backup a data item (117) to a companion electronic device (323,324), a fourth data sharing rule 404 requires that the authorized user (113) be alone with the companion electronic device (323,324) and the electronic device (112). This fourth data sharing rule 404 ensures that other electronic devices, potentially belonging to malfeasants, do not intercept electronic communications between the electronic device (112) and the companion electronic device (323,324).

In still other embodiments, before an electronic device (112) can backup a data item (117) to a companion electronic device (323,324), a fifth data sharing rule 405 requires that only recognized individuals are present with the companion electronic device (323,324) and the electronic device (112). This fifth data sharing rule 405 may allow a backup process to occur when, for example, a husband is backing up the data item (117) and his wife is nearby with her electronic device. However, the fifth data sharing rule 405 may preclude any backup when an unknown person with an unknown electronic device is present, and so forth.

In other embodiments, before an electronic device (112) can backup a data item (117) to a companion electronic device (323,324), a sixth data sharing rule 406 requires that the companion electronic device (323,324) and the electronic device (112) to have the same backup settings. For example, the authorized user (113) may be required to configure the electronic device (112) and the companion electronic device (323,324) to participate in the backup process, thereby limiting the method (300) of FIG. 3 to only those devices so configured by the authorized user (113).

In other embodiments, before an electronic device (112) can backup a data item (117) to a companion electronic device (323,324), a seventh data sharing rule 407 requires that the companion electronic device (323,324) and the electronic device (112) have been previously paired, using a particular communication protocol, in the past. This pairing requirement ensures that only devices that have been actively paired by the authorized user (113) are used in the method (300) of FIG. 3. In other embodiments, before an electronic device (112) can backup a data item (117) to a companion electronic device (323,324), an eighth data sharing rule 408 requires that the companion electronic device (323,324) and the electronic device (112) are actively paired, using a particular communication protocol, when the method (300) of FIG. 3 is occurring.

In other embodiments, before an electronic device (112) can backup a data item (117) to a companion electronic device (323,324), a ninth data sharing rule 409 requires that one or both of the companion electronic device (323,324) and/or the electronic device (112) receive additional authorization prior to participating in the method (300) of FIG. 3. Illustrating by example, the authorized user (113) may need to deliver biometric information, such as a fingerprint or facial scan, to each of the electronic device (112) and the companion electronic device (323,324) prior to the method (300) of FIG. 3 proceeding. In other embodiments, the authorized user (113) may need to deliver other additional authorization, such as a PIN or passcode, before the method (300) can proceed, and so forth.

In other embodiments, before an electronic device (112) can backup a data item (117) to a companion electronic device (323,324), a tenth data sharing rule 410 requires that the companion electronic device (323,324) and the electronic device (112) must detect the same environmental conditions. For example, the tenth data sharing rule 410 may require the temperature to be the same as measured by the electronic device (112) and the companion electronic device (323,324). Alternatively, the tenth data sharing rule 410 may require the humidity level, altitude, motion, or other parametric condition be the same as measured by the electronic device (112) and the companion electronic device (323,324) before the method (300) of FIG. 3 can proceed, and so forth. Other conditions suitable for use with the tenth data sharing rule will be obvious to those of ordinary skill in the art having the benefit of this disclosure.

In other embodiments, before an electronic device (112) can backup a data item (117) to a companion electronic device (323,324), an eleventh data sharing rule 411 requires that the companion electronic device (323,324) and the electronic device (112) capture the same biometric data. For example, when the electronic device (112) and the companion electronic device (323,324) are configured with imagers or depth scanners, in one or more embodiments the eleventh data sharing rule 411 requires them to capture the same image of the same face prior to the method (300) of FIG. 3 proceeding, and so forth.

It should be noted that the various data sharing rules illustrated in FIG. 4 can be used alone or in combination. Thus, as shown and described in FIG. 4, the at least one data sharing condition used by at decision 309 can comprise one or more of the electronic device (112) and the companion electronic device (323,324) being at a common location, the electronic device (112) and the companion electronic device (323,324) being at a known location, the electronic device (112) and the companion electronic device (323,324) being within a predefined distance from each other, the electronic device (112) and the companion electronic device (323,324) being at a known location of residence of an authorized user of the electronic device, or combinations thereof. Moreover, these data sharing rules are illustrative only, and are intended to show some of the myriad of additional security measures that can be incorporated into the method (300) of FIG. 3 in accordance with embodiments of the disclosure. Numerous other data sharing rules suitable for use with decision 309 will be obvious to those of ordinary skill in the art having the benefit of this disclosure.

Turning now back to FIG. 3, in one or more embodiments when the data sharing rules are not enabled and/or are not met, the method 300 proceeds to step 310 where the backup process is precluded. However, if the data sharing rules are not enabled, or if they are enabled and are met, as determined by decision 309, the method 300 moves to step 311. Accordingly, in one or more embodiments decision 309 comprises determining, with the one or more processors of the electronic device 112, whether at least one data sharing condition for one or both of the electronic device 112 and the at least one companion electronic device 323,324. Where it is, decision 309 allows, by eventually moving to step 313, the delivering the at least a first encrypted subset data item 320 from the plurality of encrypted subset data items 319 and the at least a second subset data item 325 from the plurality of encrypted subset data items 325 to the at least one companion electronic device only when the at least one data sharing condition is met.

At step 311, in one or more embodiments the one or more processors of the electronic device 112 create a mapping (500) of the plurality of encrypted subset data items 319 for storage in a memory of the electronic device 112. Optionally, in one or more embodiments step 312 comprises the one or more processors of the electronic device 112 sharing and/or backing up the mapping (500) created at step 311 with one or more companion electronic devices 323,324. In one embodiment, the one or more processors of the electronic device 700 will share the mapping (500) created at step 108 with one or more companion electronic devices 323,324 so that any electronic device belonging to the authorized user 113 can access the data item 117.

Where the one or more processors of the electronic device 112 opt, at step 312, to store the mapping (500) in the companion electronic devices 323,324, in one or more embodiments the one or more processors cause the communication device of the electronic device 112 to simply transmit the mapping (500) to the companion electronic devices 323,324. The one or more processors of the electronic device 112 can cause the communication device to transmit updates of the mapping (500) as they are made.

Alternatively, in other embodiments, where the one or more processors of the electronic device 112 opt, at step 312, to backup the mapping (500) created at step 311 in a companion electronic devices 323,324, in one or more embodiments the one or more processors use the method of FIG. 1, which includes the one or more processors selecting the mapping (500) for storage in the companion electronic device 323,324, encrypting the mapping (500) to create an encrypted mapping data item, dividing the encrypted mapping data item to create a plurality of encrypted mapping subset data items, and causing the communication device to transmit at least a first encrypted mapping subset data item from the plurality of encrypted mapping subset data items and at least a second encrypted mapping subset data item from the plurality of encrypted mapping subset data items to the companion electronic devices 323,324. In one or more embodiments, the times at which the various encrypted mapping subset data items are transmitted to the companion electronic devices 323,324 can be randomized.

Embodiments of the disclosure contemplate that the authorized user 113 may wish to have their tablet computer and laptop computer, for example, to have access to data items 117 stored by the electronic device 112 in the various companion electronic devices 323,324. In such situations, each companion electronic device 323,324 would need a copy of the mapping (500) as well. As the one or more processors update the mapping (500) while performing the subsequent steps of the method 300 of FIG. 3, the process occurring at step 312 can be repeated in one or more embodiments. In other embodiments, the one or more processors may elect to wait to perform the sharing component of step 312 at the end of the method 300 of FIG. 3.

At step 313, the one or more processors of the electronic device 112 deliver, with a communication device of the electronic device 112, at least a first encrypted subset data item 320 from the plurality of encrypted subset data items 319 and at least a second subset data item 325 from the plurality of encrypted subset data items 319 to at least one companion electronic device. In the example of FIG. 3, the first encrypted subset data item 320 is delivered to companion electronic device 323, while the second encrypted subset data item 325 is delivered to a different companion electronic device, i.e., companion electronic device 324. However, in other embodiments, each encrypted subset data item 320,325 of the plurality of encrypted subset data item 319 will be delivered to a single companion electronic device, e.g., companion electronic device, 323.

In the illustrative embodiment of FIG. 3, the at least a first encrypted subset data item 320 and the at least a second subset encrypted data item 325 are different subset encrypted data items. Moreover, in the illustrative embodiment of FIG. 3, the delivering the at least a first encrypted subset data item 320 from the plurality of encrypted subset data items 319 and the at least a second subset data item 325 from the plurality of encrypted subset data items 325 to the companion electronic devices 323,324 occur at different times. In one or more embodiments, these different times are selected randomly, as previously described.

Figure 6:
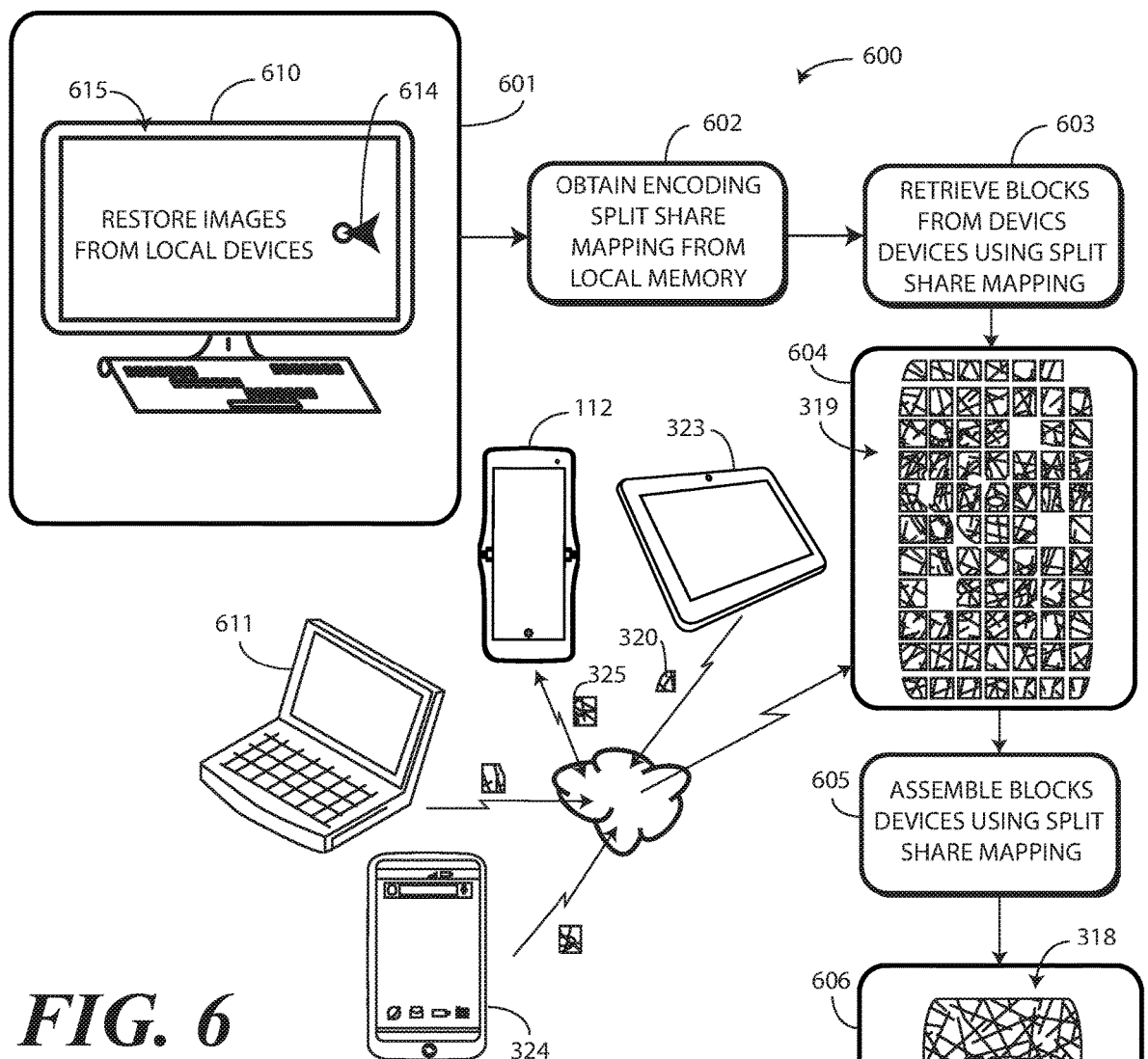
FIG. 6 illustrates still another explanatory method and system in accordance with one or more embodiments of the disclosure.

Turning now to FIG. 6, illustrated therein is one explanatory method 600 for retrieving a data item 117 when the data item 117 is stored in one or more companion electronic devices in accordance with the method (300) of FIG. 3. Beginning at step 601, the authorized user of a companion electronic device 610 is delivering user input 614 to the user interface 615 of the companion electronic device 610 requesting retrieval of the data item 117, which is stored in the companion electronic devices 323,324,611, as well as in electronic device 112.

At step 602, the companion electronic device 610 retrieves the mapping (500). In one or more embodiments, this retrieval occurs from a companion electronic device. For example, step 602 may include the one or more processors of the companion electronic device 610 requesting and retrieving the mapping (500) from the electronic device 112, since it originally stored the data item 117 in the companion electronic devices 610,611,323,324. Thus, in one or more embodiments step 602 can comprise the companion electronic device 610 requesting the mapping (500) from a companion electronic device. Alternatively, where the companion electronic device 610 already has the mapping (500) stored in local memory, step 602 comprises retrieving the mapping (500) from local memory.

Step 604 then comprises retrieving, with the one or more processors of the companion electronic device 610, at least a first encrypted subset data item 320 of the plurality of encrypted subset data items 319 from a first companion electronic device 323 of companion electronic device 610. Step 604 also includes retrieving additional encrypted subset data items from other companion electronic devices of companion electronic device 610, e.g., retrieving at least a second encrypted subset data item 325 from electronic device 112, until each encrypted subset data item of the plurality of encrypted subset data items 319 have been retrieved.

At step 605, and as shown at step 606, the one or more processors of the companion electronic device 610 then assemble, using the mapping (500) of the plurality of encrypted subset data items 319 retrieved at either step 602, the various encrypted subset data items 320,325 to form the encrypted data item 318. For example, step 605 can include assembling the at least a first encrypted subset data item 320, the at least a second encrypted subset data item 325, and so forth, to assemble the encrypted data item 318, which is shown at step 606. At step 607, the one or more processors of the companion electronic device 610 de-encrypt the encrypted data item 318 to obtain the data item 117, which can then be presented to the authorized user as shown at step 608 and/or stored in the memory of the electronic device 112.

Figure 7:
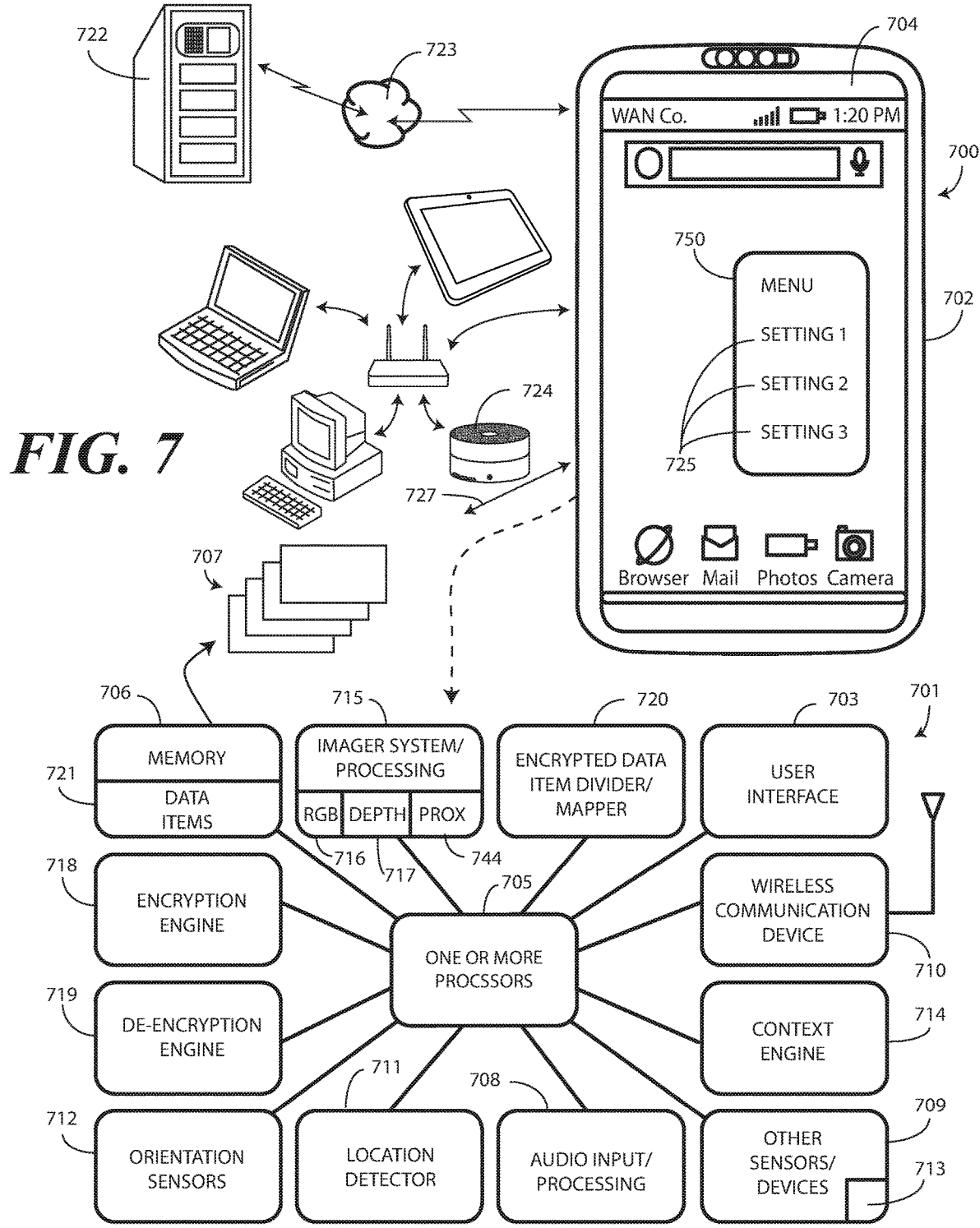
FIG. 7 illustrates one explanatory electronic device and corresponding system in accordance with one or more embodiments of the disclosure.

Turning now to FIG. 7, illustrated therein is a schematic block diagram 701 of one explanatory electronic device 700 configured in accordance with one or more embodiments of the disclosure. It should be noted that the schematic block diagram 701 includes components that any of the various electronic devices described above, e.g., electronic device (112) or companion electronic devices (323,324,610,611) may comprise to execute the various methods and interact with the various systems described herein. Thus, while electronic device 700 is shown as a smartphone for illustrative purposes, it could also be any of a tablet computer, laptop computer, desktop computer, or other electronic device.

In one or more embodiments, the components of the block diagram schematic 701 are configured as a printed circuit board assembly disposed within a housing 702 of the electronic device 700. Various components can be electrically coupled together by conductors or a bus disposed along one or more printed circuit boards.

The illustrative block diagram schematic 701 of FIG. 7 includes many different components. Embodiments of the disclosure contemplate that the number and arrangement of such components can change depending on the particular application. Accordingly, electronic devices configured in accordance with embodiments of the disclosure can include some components that are not shown in FIG. 7, and other components that are shown may not be needed and can therefore be omitted.

The illustrative block diagram schematic 701 includes a user interface 703. In one or more embodiments, the user interface 703 includes a display 704. Where included, the display 704 may optionally be touch-sensitive.

In one or more embodiments, users can deliver user input to the display 704 of such an embodiment by delivering touch input from a finger, stylus, or other objects disposed proximately with the display 704. In one embodiment, the display 704 is configured as an active matrix organic light emitting diode (AMOLED) display. However, it should be noted that other types of displays, including liquid crystal displays, suitable for use with the user interface 703 would be obvious to those of ordinary skill in the art having the benefit of this disclosure.

In one embodiment, the electronic device includes one or more processors 705. The one or more processors 705 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device. The application processor and the auxiliary processor(s) can be operable with the various components of the block diagram schematic 701. Each of the application processor and the auxiliary processor(s) can be configured to process and execute executable software code to perform the various functions of the electronic device with which the block diagram schematic 701 operates. A storage device, such as memory 706, can optionally store the executable software code used by the one or more processors 705 during operation.

In this illustrative embodiment, the block diagram schematic 701 also includes a communication device 710 that can be configured for wired or wireless communication with one or more other devices or networks. The networks can include a wide area network, a local area network, and/or personal area network. The communication device 710 may also utilize wireless technology for communication, such as, but are not limited to, peer-to-peer or ad hoc communications such as HomeRF, Bluetooth, and IEEE 802.11, as well as other forms of wireless communication such as infrared technology. The communication device 710 can include wireless communication circuitry, one of a receiver, a transmitter, or transceiver, and one or more antennas.

In one embodiment, the one or more processors 705 can be responsible for performing the primary functions of the electronic device with which the block diagram schematic 701 is operational. For example, in one embodiment the one or more processors 705 comprise one or more circuits operable with the user interface 703 to present presentation information to a user. The executable software code used by the one or more processors 705 can be configured as one or more modules 707 that are operable with the one or more processors 705. Such modules 707 can store instructions, control algorithms, and so forth.

In one or more embodiments, the block diagram schematic 701 includes an audio input/processor 708. The audio input/processor 708 can include hardware, executable code, and speech monitor executable code in one embodiment. The audio input/processor 708 can include, stored in memory 706, basic speech models, trained speech models, or other modules that are used by the audio input/processor 708 to receive and identify voice commands that are received with audio input captured by an audio capture device. In one embodiment, the audio input/processor 708 can include a voice recognition engine. Regardless of the specific implementation utilized in the various embodiments, the audio input/processor 708 can access various speech models to identify speech commands.

Various sensors 709 can be operable with the one or more processors 705. FIG. 7 illustrates several examples such sensors 709. It should be noted that those shown in FIG. 7 are not comprehensive, as others will be obvious to those of ordinary skill in the art having the benefit of this disclosure. Additionally, it should be noted that the various sensors 709 shown in FIG. 7 could be used alone or in combination. Accordingly, many electronic devices will employ only subsets of the sensors 709 shown in FIG. 7, with the particular subset defined by device application.

A first example of a sensor 709 that can be included with the other components is a touch sensor. The touch sensor can include a capacitive touch sensor, an infrared touch sensor, resistive touch sensors, or another touch-sensitive technology. Other types of touch sensors will be obvious to those of ordinary skill in the art having the benefit of this disclosure.

Another example of a sensor 709 is a geo-locator that serves as a location detector 711. In one embodiment, location detector 711 is able to determine location data identifying where the electronic device 700 is situated. Location data can be captured in a variety of ways, including by capturing the location data from a constellation of one or more earth orbiting satellites, or from a network of terrestrial base stations to determine an approximate location. The location detector 711 may also be able to determine location by locating or triangulating terrestrial base stations of a traditional cellular network, or from other local area networks, such as Wi-Fi networks.

One or more motion detectors can be configured as an orientation detector 712 that determines an orientation and/or movement of the electronic device 700 in three-dimensional space. Illustrating by example, the orientation detector 712 can include an accelerometer, gyroscopes, or other device to detect device orientation and/or motion of the electronic device 700. The orientation detector 712 can determine the spatial orientation of an electronic device 700 in three-dimensional space by, for example, detecting a gravitational direction. In addition to, or instead of, an accelerometer, an electronic compass can be included to detect the spatial orientation of the electronic device relative to the earth's magnetic field. Similarly, one or more gyroscopes can be included to detect rotational orientation of the electronic device 700.

Other components 713 operable with the one or more processors 705 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker disposed behind a speaker port or other alarms and/or buzzers and/or a mechanical output component such as vibrating or motion-based mechanisms.

The other components 713 can also include proximity sensors 744. The proximity sensors 744 fall in to one of two camps: active proximity sensors and "passive" proximity sensors. Either the proximity detector components or the proximity sensor components can be generally used for gesture control and other user interface protocols, some examples of which will be described in more detail below.

As used herein, a "proximity sensor component" comprises a signal receiver only that does not include a corresponding transmitter to emit signals for reflection off an object to the signal receiver. A signal receiver only can be used due to the fact that a user's body or other heat generating object external to device, such as a wearable electronic device worn by user, serves as the transmitter. Illustrating by example, in one the proximity sensor components comprise a signal receiver to receive signals from objects external to the housing 702 of the electronic device 700. In one embodiment, the signal receiver is an infrared signal receiver to receive an infrared emission from an object such as a human being when the human is proximately located with the electronic device 700.

Proximity sensor components are sometimes referred to as a "passive IR detectors" due to the fact that the person is the active transmitter. Accordingly, the proximity sensor component requires no transmitter since objects disposed external to the housing deliver emissions that are received by the infrared receiver. As no transmitter is required, each proximity sensor component can operate at a very low power level.

By contrast, proximity detector components include a signal emitter and a corresponding signal receiver. While each proximity detector component can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components comprise infrared transmitters and receivers.

In one or more embodiments, each proximity detector component can be an infrared proximity sensor set that uses a signal emitter that transmits a beam of infrared light that reflects from a nearby object and is received by a corresponding signal receiver. Proximity detector components can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals.

The other components 713 can optionally include a barometer or altimeter operable to sense changes in air pressure due to elevation changes or differing pressures of the electronic device 700. The other components 713 can also optionally include a light sensor that detects changes in optical intensity, color, light, or shadow in the environment of an electronic device. An infrared sensor can be used in conjunction with, or in place of, the light sensor. Similarly, the other components 713 can include a temperature sensor configured to monitor temperature about an electronic device 700.

A context engine 714 can then operable with the various sensors to detect, infer, capture, and otherwise determine persons and actions that are occurring in an environment about the electronic device 700. For example, where included one embodiment of the context engine 714 determines assessed contexts and frameworks using adjustable algorithms of context assessment employing information, data, and events. These assessments may be learned through repetitive data analysis. These assessments can be used to obtain additional authorization to transmit media content in one or more embodiments. Alternatively, a user may employ the user interface 703 to enter various parameters, constructs, rules, and/or paradigms that instruct or otherwise guide the context engine 714 in detecting multi-modal social cues, emotional states, moods, and other contextual information that can be used as additional authorization to transmit media content in response to a prompt by the one or more processors 705. The context engine 714 can comprise an artificial neural network or other similar technology in one or more embodiments.

In one or more embodiments, the context engine 714 is operable with the one or more processors 705. In some embodiments, the one or more processors 705 can control the context engine 714. In other embodiments, the context engine 714 can operate independently, delivering information gleaned from detecting multi-modal social cues, emotional states, moods, and other contextual information to the one or more processors 705. The context engine 714 can receive data from the various sensors. In one or more embodiments, the one or more processors 705 are configured to perform the operations of the context engine 714.

In one or more embodiments, an imager processor system 715 comprises an imager 716.

The imager processor system 715 can also include an optional depth imager 717. In one embodiment, the imager 716 comprises a two-dimensional imager, such as a two-dimensional RGB imager. In another embodiment, the imager 716 comprises an infrared imager. Other types of imagers suitable for use as the imager 716 will be obvious to those of ordinary skill in the art having the benefit of this disclosure.

The depth imager 717, where included, can take a variety of forms. For example, the depth imager 717 can comprise a pair of imagers separated by a predetermined distance, such as three to four images. This "stereo" imager works in the same way the human eyes do in that it captures images from two different angles and reconciles the two to determine distance.

Alternatively, the depth imager 717 can comprise a structured light laser that projects tiny light patterns that expand with distance. These patterns land on a surface, such as a user's face, and are then captured by an imager. By determining the location and spacing between the elements of the pattern, three-dimensional mapping can be obtained.

In still another embodiment, the depth imager 717 comprises a time of flight device. Time of flight three-dimensional sensors emit laser or infrared pulses from a photodiode array. These pulses reflect back from a surface, such as the user's face. The time it takes for pulses to move from the photodiode array to the surface and back determines distance, from which a three-dimensional mapping of a surface can be obtained.

An encryption engine 718 can be configured to encrypt one or more data items 721 stored in the memory 706. The encryption engine 718 can encrypt such data items 721 in a variety of ways. For example, in one or more embodiments the encryption engine 718 encrypts data items 721 using a seed, which can be generated as a random number by the one or more processors 705. The one or more processors 705 of the electronic device 700 can be equipped with a true random number generator that generates a random number that forms the basis of the seed. Since the hardware generates a truly random number in one or more embodiments, the seed becomes a function of this random number.

In one or more embodiments, the encryption engine 718 encodes the data item 721 using the seed to obtain encrypted data items. The encryption engine 718 can employ encryption keys so that so that only devices having the key can decode the encrypted data items. In one or more embodiments, the encryption engine 718 includes a cipher that encrypts the data items 721 using the encryption key to obtain the encrypted data items. For all practical purposes, decryption of the encrypted data items is impossible without the encryption key. In other embodiments, the encryption engine 718 creates a random encryption key by using a random number generator as a seed.

In one or more embodiments, the encryption key used by the encryption engine 718 can be a function of multiple factors. Examples of such factors include data representations corresponding to unique characteristics of an authorized user of the electronic device 700, including fingerprints, iris features, facial shapes, skin tones, hair colors, eye colors, facial mapping in three dimensions, iris scans, voice profiles, and other factors. In addition to these unique characteristics, the encryption engine 718 can employ non-biometric information, such as a personal identification number (PIN), a user's location, and so forth to create the encryption key.

A divider/mapper 720 can then divide the encrypted data items from the encryption engine 718 to obtain a plurality of encrypted subset data items. Since the encrypted data items are divided into the plurality of encrypted subset data items after encryption by the encryption engine 718, de-encryption of any one encrypted subset data item will not reveal any recognizable information of the original data item 117. Said differently, de-encryption of any encrypted data item requires all of its encrypted subset data items to be successful in one or more embodiments.

Advantageously, if any nefarious actor obtains a one or more encrypted subset data items, without having every single encrypted subset data item of the plurality of encrypted subset data items, it will be of no value. Each encrypted subset data item is encrypted, which means that the nefarious actor would need to know the encryption scheme in use and have access to the encryption key, which is stored only in the memory 706 of the electronic device 700 in one or more embodiments. If the encryption key is a function of data representations corresponding to unique characteristics of the authorized user, such as a fingerprint, iris features, facial shape, skin tone, hair color, eye color, facial mapping in three dimensions, iris scans, or voice profile, non-biometric information, such as a personal identification number (PIN) or a user's location, this information would be required to the encryption key as well. Since a nefarious actor not having access to the electronic device 700 or the authorized user of the electronic device would be unlikely to have the encryption key, the encryption of the encrypted subset data item would be secured.

In one or more embodiments, the divider/mapper 720 is operable create a mapping (500) of the plurality of encrypted subset data items. In one or more embodiments, the divider/mapper 720 can store this mapping (500) in the memory 706 of the electronic device 700. Alternatively, it can share the mapping (500) with one or more companion electronic devices, as previously described.

A de-encryption engine 719 can de-encrypt encrypted data items. In one or more embodiments, the de-encryption engine 719 uses the encryption key created by the encryption engine 718 and encrypts the encrypted data item after the one or more processors 705 have assembled all of the encrypted subset data items of the plurality of encrypted subset data items segmented by the divider/mapper 720 to form the encrypted data item. Once the de-encryption engine 719 has de-encrypted the encrypted data item, it can then be presented at the user interface 703 or stored in the memory 706.

In one or more embodiments, the one or more processors 705 select at least one data item 721 stored in the memory 706 for storage in at least one remote electronic device. The at least one remote electronic device can be one or multiple remote electronic devices. The at least one remote electronic device can be a cloud server 722 in communication with the electronic device 700 across a network 723 in one or more embodiments. In other embodiments, the at least one remote electronic device can be a companion electronic device 724.

In one or more embodiments, the encryption engine 718 encrypts the at least one data item to create at least one encrypted data item. The divider/mapper 720 then divides the at least one encrypted data item into a plurality of encrypted subset data items. The one or more processors 705 can then cause the communication device 710 to transmit at least a first encrypted subset data item from the plurality of encrypted subset data items and at least a second subset data item from the plurality of encrypted subset data items to the at least one remote electronic device. In one or more embodiments, the at least a first encrypted subset data item and the at least a second subset encrypted data item are different subset encrypted data items and are delivered to the at least one remote electronic device at different times, which can be chosen randomly.

As previously described, where the at least one remote electronic device comprises a companion electronic device 724, one or more data sharing rules, which an authorized user can configure using one or more settings 725 of a menu 750 in one or more embodiments, can be employed. For example, for the one or more processors 705 to cause the communication device 710 to transmit data to a companion electronic device 724, in one or more embodiments the companion electronic device 724 must be located within a predefined distance 727 of the electronic device 700. Where the at least one remote electronic device is a companion electronic device 724, the one or more processors 705 can also cause the communication device 710 to deliver the mapping (500) created by the divider/mapper 720 to each companion electronic device as well.

Figure 8:
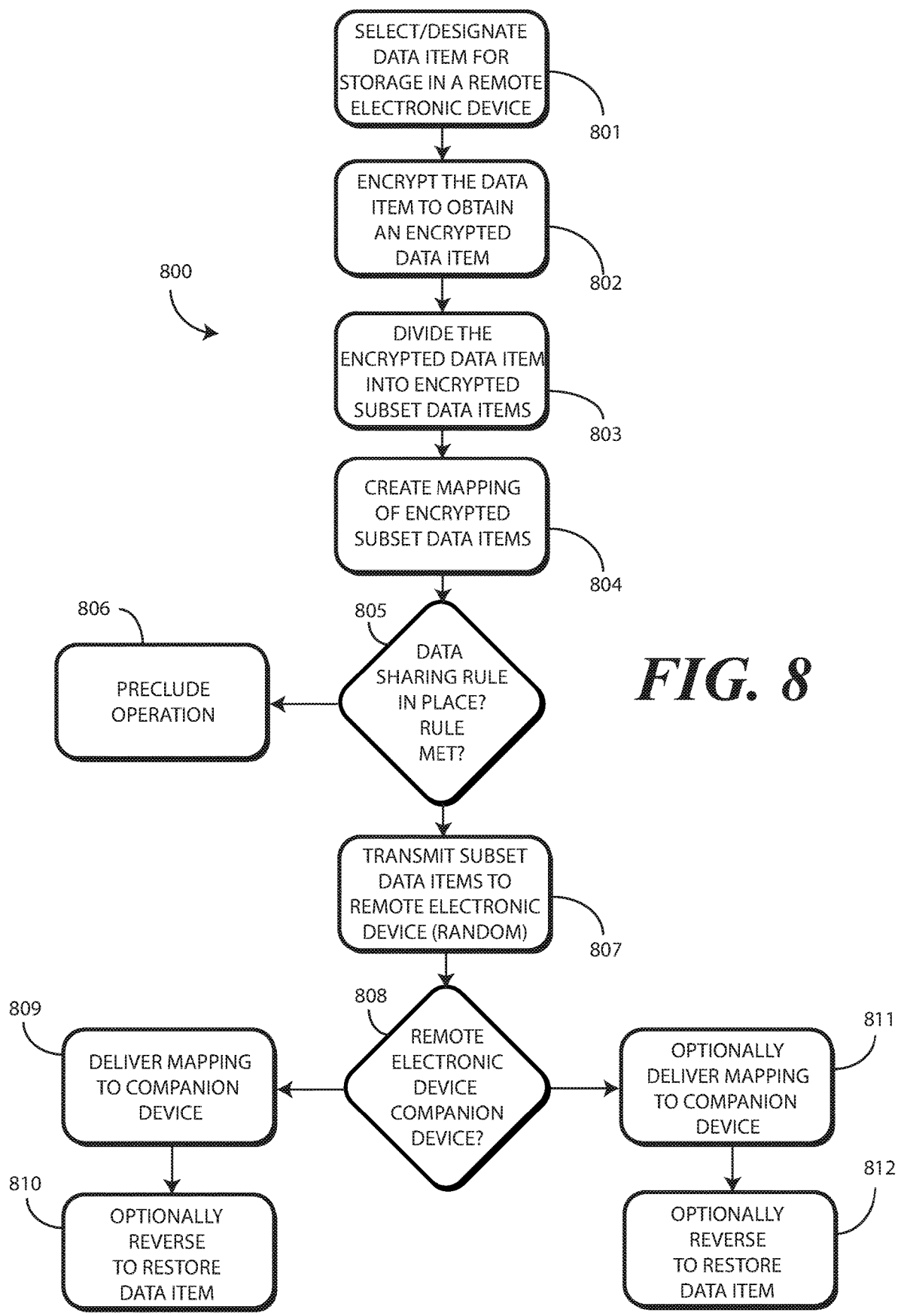
FIG. 8 illustrates one explanatory method in accordance with one or more embodiments of the disclosure.

Turning now to FIG. 8, illustrated therein is yet another method 800 configured in accordance with one or more embodiments of the disclosure. Beginning at step 801, the method 800 designates, using one or more processors of an electronic device, at least one data item stored within a memory of the electronic device for storage in at least one remote electronic device. The at least one remote electronic device may be a cloud server, a companion electronic device, or other type of device. Step 801 can comprise the one or more processors of the electronic device selecting the at least one data item stored in memory for storage in the remote electronic device as well.

At step 802, the method 800 encrypts, using one or more processors of an electronic device, an encryption engine, or combinations thereof, the at least one data item to create at least one encrypted data item. At step 803, the method 800 divides, using the one or more processors of the electronic device, a divider/mapper, or combinations thereof, the encrypted data item into a plurality of encrypted subset data items. In one or more embodiments, step 803 occurs after step 802.

At step 804, the method 800 creates, using the one or more processors, a divider/mapper, or combinations thereof, a mapping of the plurality of encrypted subset data items. In one or more embodiments, the mapping is updated as the method 800 progresses to include information relating to the plurality of encrypted subset data items. Illustrating by example, in one or more embodiments the mapping created at step 804, after updates during the method 800, identifies a mode of encryption used to encrypt the at least one encrypted data item, an identifier of at least a first remote electronic device where at least a first encrypted subset data item is stored, an identifier of a second remote electronic device where at least a second encrypted subset data item is stored, and so forth, for each of the plurality of encrypted subset data items. Other information suitable for inclusion in the mapping will be obvious to those of ordinary skill in the art having the benefit of this disclosure.

At decision 805, the method 800 determines, with the one or more processors of the electronic device, whether at least one data sharing condition for one or both of the electronic device and the at least one remote electronic device are enabled and/or met. Examples of such data sharing conditions comprise one or more of the electronic device and the at least one remote electronic device being at a common location, the electronic device and the at least one remote electronic device being at a known location, the electronic device and the at least one remote electronic device being within a predefined distance from each other, the electronic device and the at least one remote electronic device being at a known location of residence of an authorized user of the electronic device, or combinations thereof. Where at least one data sharing condition for one or both of the electronic device and the at least one remote electronic device is enabled and not met, the method 800 terminates at step 806 because the backup process is precluded. Otherwise, where at least one data sharing condition for one or both of the electronic device and the at least one remote electronic device is enabled and is met, the method 800 moves to step 807.

At step 807, the method 800 delivers, when the one or more processors cause a communication device to act, at least a first encrypted subset data item from the plurality of encrypted subset data items to a first remote electronic device and at least a second subset data item from the plurality of encrypted subset data items to a second remote electronic device. In one or more embodiments, the at least a first encrypted subset data item and the at least a second subset encrypted data item are different subset encrypted data items. In one or more embodiments, the first remote electronic device and the second remote electronic device are different remote electronic devices. In one or more embodiments, the delivery of the at least a first encrypted subset data item from the plurality of encrypted subset data items to the first remote electronic device and the at least a second subset data item from the plurality of encrypted subset data items to the second remote electronic device occur at different times. In one or more embodiments, these different times are selected randomly. In one or more embodiments, the delivery of the at least a first encrypted subset data item from the plurality of encrypted subset data items and the at least a second subset data item from the plurality of encrypted subset data items to the at least one remote electronic device occurs only when the at least one data sharing condition is met.

Decision 808 determines whether the at least one remote electronic device comprises a companion electronic device or another type of electronic device, such as a cloud server. Where the at least one remote electronic device is a companion electronic device, optional step 809 comprises storing the mapping created at step 804 in a memory of the at least one companion electronic device. Step 810 reverses the method 800, thereby causing a retrieval, with the communication circuit, of the at least a first encrypted subset data item from the plurality of encrypted subset data items from the first remote electronic device and the at least a second subset data item from the plurality of encrypted subset data items from the second remote electronic device, assembly, with the one or more processors using the mapping of the plurality of encrypted subset data items, the at least a first encrypted subset data item and the at least a second subset data item to form the at least one encrypted data item, and a de-encryption of the at least one encrypted data item to obtain the data item.

Where the at least one remote electronic device is not a companion electronic device, optional step 811 backs up, using the encryption, division, and transmission of encrypted subset data items, the mapping created at step 804 in a memory of the at least one companion electronic device for safe keeping. Step 812 reverses the method 800, thereby causing a retrieval, with the communication circuit, of the at least a first encrypted subset data item from the plurality of encrypted subset data items from the first remote electronic device and the at least a second subset data item from the plurality of encrypted subset data items from the second remote electronic device, assembly, with the one or more processors using the mapping of the plurality of encrypted subset data items, the at least a first encrypted subset data item and the at least a second subset data item to form the at least one encrypted data item, and a de-encryption of the at least one encrypted data item to obtain the data item.

Figure 9:
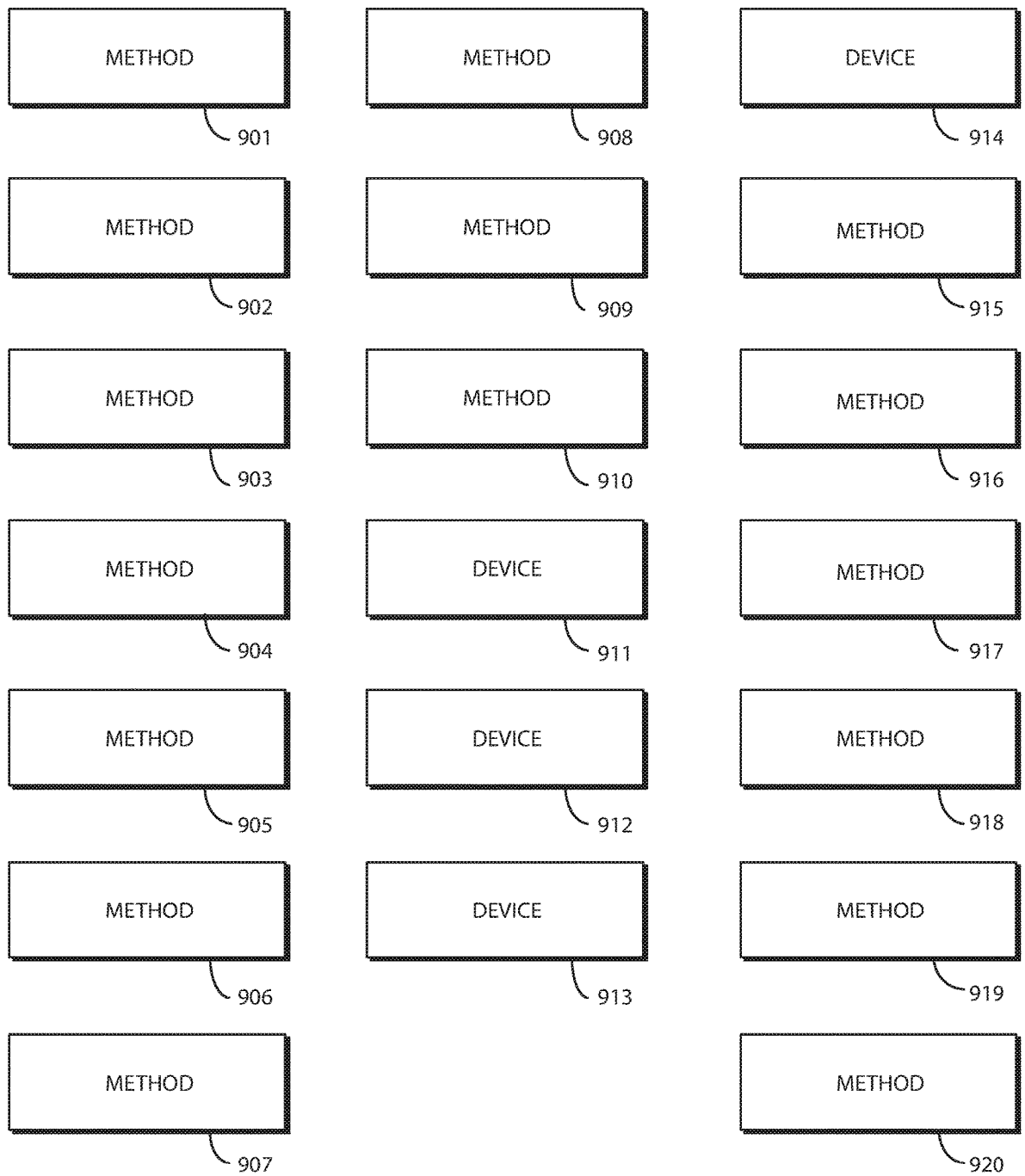
FIG. 9 illustrates various embodiments of the disclosure.

Turning now to FIG. 9, illustrated therein are various embodiments of the disclosure. The embodiments of FIG. 9 are shown as labeled boxes in FIG. 9 due to the fact that the individual components of these embodiments have been illustrated in detail in FIGS. 1-8, which precede FIG. 9. Accordingly, since these items have previously been illustrated and described, their repeated illustration is no longer essential for a proper understanding of these embodiments. Thus, the embodiments are shown as labeled boxes.

At 901, a method in an electronic device comprises designating, with one or more processors of the electronic device, at least one data item stored within a memory of the electronic device for storage in a plurality of remote electronic devices. At 901, the method comprises encrypting, with the one or more processors, the at least one data item to create at least one encrypted data item.

At 901, the method comprises dividing, with the one or more processors, the at least one encrypted data item into a plurality of encrypted subset data items. At 901, the method comprises delivering, with a communication device, at least a first encrypted subset data item from the plurality of encrypted subset data items to a first remote electronic device and at least a second subset data item from the plurality of encrypted subset data items to a second remote electronic device, where the at least a first encrypted subset data item and the at least a second subset encrypted data item are different encrypted subset data items.

At 902, the first remote electronic device and the second remote electronic device of 901 are different remote electronic devices. At 903, the delivering of the at least a first encrypted subset data item from the plurality of encrypted subset data items to the first remote electronic device and the at least a second subset data item from the plurality of encrypted subset data items to the second remote electronic device of 902 occur at different times. At 904, the different times of 903 are selected randomly.

At 905, de-encryption of the at least one encrypted data item of 903 requires all encrypted subset data items of the plurality of encrypted subset data items. At 906, the method of 903 further comprises storing, in the memory of the electronic device, a mapping of the plurality of encrypted subset data items. At 907, the mapping of 906 identifies a mode of encryption used to encrypt the at least one encrypted data item and an identifier of the first remote electronic device where the at least a first encrypted subset data item is stored and the second remote electronic device where the at least a second encrypted subset data item is stored. At 908, the mapping of 906 is stored in a memory of at least one companion electronic device.

At 909, the method of 906 further comprises retrieving, with the communication device, the at least a first encrypted subset data item from the plurality of encrypted subset data items from the first remote electronic device and the at least a second encrypted subset data item from the plurality of encrypted subset data items from the second remote electronic device. At 909, the method comprises assembling, with the one or more processors using the mapping of the plurality of encrypted subset data items, the at least a first encrypted subset data item and the at least a second encrypted subset data item to form the at least one encrypted data item.

At 910, the method of claim 909 further comprises de-encrypting the at least one encrypted data item to obtain the at least one data item. At 901, the method comprises storing the at least one data item in the memory of the electronic device.

At 911, an electronic device comprises a memory, one or more processors operable with the memory, and a communication device operable with the one or more processors. At 911, the one or more processors select at least one data item stored in the memory for storage in at least one remote electronic device, encrypt the at least one data item to create at least one encrypted data item, divide the at least one encrypted data item into a plurality of encrypted subset data items, and cause the communication device to transmit at least a first encrypted subset data item from the plurality of encrypted subset data items and at least a second subset data item from the plurality of encrypted subset data items to the at least one remote electronic device. At 911, the at least a first encrypted subset data item and the at least a second subset encrypted data item are different subset encrypted data items and are delivered to the at least one remote electronic device at different times.

At 912, the at least one remote electronic device of 911 comprises a plurality of cloud servers. At 913, the at least one remote electronic device of 911 comprises a plurality of companion electronic devices located within a predefined distance of the electronic device. At 904, the communication device of 913 further delivers a mapping of the plurality of encrypted subset data items to each companion electronic device of the plurality of companion electronic devices.

At 915, a method in an electronic device comprises identifying, with a communication device of the electronic device, at least one companion electronic device in communication with the electronic device. At 915, the method comprises designating, with one or more processors of the electronic device, at least one data item stored within a memory of the electronic device for at least partial storage in the at least one companion electronic device.

At 915, the method comprises encrypting, with the one or more processors, the at least one data item to create at least one encrypted data item. At 915, the method comprises dividing, with the one or more processors, the at least one encrypted data item into a plurality of encrypted subset data items.

At 915, the method comprises delivering, with a communication device, at least a first encrypted subset data item from the plurality of encrypted subset data items and at least a second subset data item from the plurality of encrypted subset data items to the at least one companion electronic device. At 915, the at least a first encrypted subset data item and the at least a second subset encrypted data item are different subset encrypted data items.

At 916, the delivering the at least a first encrypted subset data item from the plurality of encrypted subset data items and the at least a second subset data item from the plurality of encrypted subset data items to the at least one companion electronic device of 915 occur at different times. At 917, the different times of 916 are selected randomly.

At 918, the method of 917 further comprises delivering a mapping of the plurality of encrypted subset data items to the at least one companion electronic device. At 919, the method of 915 further comprises determining, with the one or more processors, whether at least one data sharing condition for one or both of the electronic device and the at least one companion electronic device is met. At 919, the method comprises allowing, by the one or more processors, the delivering the delivering the at least a first encrypted subset data item from the plurality of encrypted subset data items and the at least a second subset data item from the plurality of encrypted subset data items to the at least one companion electronic device only when the at least one data sharing condition is met. At 920, the at least one data sharing condition of 919 comprises one or more of the electronic device and the companion electronic device being at a common location, the electronic device and the companion electronic device being at a known location, the electronic device and the companion electronic device being within a predefined distance from each other, or combinations thereof.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:
    designating, with one or more processors of the electronic device, at least one data item stored within a memory of the electronic device for storage in a plurality of remote electronic devices;
    encrypting, with the one or more processors, the at least one data item to create at least one encrypted data item;
    dividing, with the one or more processors, the at least one encrypted data item into a plurality of encrypted subset data items;
    creating, with the one or more processors, a mapping of the plurality of encrypted subset data items;
    encrypting, with the one or more processors, the mapping of the plurality of encrypted subset data items to obtain an encrypted mapping of the plurality of subset data items;
    dividing, with the one or more processors, the encrypted mapping of the plurality of encrypted subset data items into a plurality of encrypted mapping subset data items;
    storing, in the memory of a companion electronic device, at least one encrypted mapping subset data item of the plurality of encrypted mapping subset data items; and
    delivering, with a communication device, at least a first encrypted subset data item from the plurality of encrypted subset data items to a first remote electronic device and at least a second subset data item from the plurality of encrypted subset data items to a second remote electronic device, where the at least a first encrypted subset data item and the at least a second subset encrypted data item are different encrypted subset data items.

2. The method of claim 1, wherein the first remote electronic device and the second remote electronic device are different remote electronic devices.

3. The method of claim 2, wherein the delivering the at least a first encrypted subset data item from the plurality of encrypted subset data items to the first remote electronic device and the at least a second subset data item from the plurality of encrypted subset data items to the second remote electronic device occur at different times.

4. The method of claim 3, wherein the different times are selected randomly.

5. The method of claim 3, wherein de-encryption of the at least one encrypted data item requires all encrypted subset data items of the plurality of encrypted subset data items.

6. The method of claim 1, further comprising storing, in a companion device, the encrypted mapping of the plurality of encrypted subset data items.

7. The method of claim 1, further comprising updating the mapping of the plurality of encrypted subset data items with one or more of an identification of a mode of encryption used to encrypt the at least one encrypted data item, an identifier of the first remote electronic device where the at least a first encrypted subset data item is stored, an identifier of the second remote electronic device where the at least a second encrypted subset data item is stored, or a timestamp identifying when each encrypted subset data item of the plurality of encrypted subset data items delivered.

8. The method of claim 1, wherein the at least one encrypted mapping subset data item comprises multiple encrypted mapping subset data items, further comprising randomizing when encrypted mapping subset data items of the multiple encrypted mapping subset data items are transmitted to the companion electronic device.

9. The method of claim 1, further comprising:
retrieving, with the communication device, the at least a first encrypted subset data item from the plurality of encrypted subset data items from the first remote electronic device and the at least a second encrypted subset data item from the plurality of encrypted subset data items from the second remote electronic device; and
assembling, with the one or more processors using the mapping of the plurality of encrypted subset data items, the at least a first encrypted subset data item and the at least a second encrypted subset data item to form the at least one encrypted data item.

10. The method of claim 9, further comprising:
de-encrypting the at least one encrypted data item to obtain the at least one data item; and
storing the at least one data item in the memory of the electronic device.

11. An electronic device, comprising:
a memory;
one or more processors operable with the memory; and
a communication device operable with the one or more processors;
the one or more processors selecting at least one data item stored in the memory for storage in at least one remote electronic device, encrypting the at least one data item to create at least one encrypted data item, dividing the at least one encrypted data item into a plurality of encrypted subset data items, creating a mapping for the plurality of encrypted subset data items, encrypting the mapping to create an encrypted mapping data item, dividing the encrypted mapping data item to create a plurality of encrypted mapping subset data items, and causing the communication device to:
transmit at least a first encrypted subset data item from the plurality of encrypted subset data items and at least a second subset data item from the plurality of encrypted subset data items to the at least one remote electronic device, wherein the at least a first encrypted subset data item and the at least a second subset encrypted data item are different subset encrypted data items and are delivered to the at least one remote electronic device; and
transmit at least a first encrypted mapping subset data item from the plurality of encrypted mapping subset data items and at least a second encrypted mapping subset data item from the plurality of encrypted mapping subset data items to at least one companion electronic device.

12. The electronic device of claim 11, wherein the at least one remote electronic device comprises a plurality of cloud servers.

13. The electronic device of claim 11, wherein the at least one remote electronic device comprises a plurality of companion electronic devices located within a predefined distance of the electronic device.

14. The electronic device of claim 13, the communication device further delivering a mapping of the plurality of encrypted subset data items to each companion electronic device of the plurality of companion electronic devices.

15. A method in an electronic device, the method comprising:
identifying, with a communication device of the electronic device, at least one companion electronic device in communication with the electronic device;
designating, with one or more processors of the electronic device, at least one data item stored within a memory of the electronic device for at least partial storage in the at least one companion electronic device;
encrypting, with the one or more processors, the at least one data item to create at least one encrypted data item;
dividing, with the one or more processors, the at least one encrypted data item into a plurality of encrypted subset data items;
creating, with the one or more processors, an encrypted mapping data item identifying the plurality of encrypted subset data items;
dividing, with the one or more processors, the encrypted mapping data item into a plurality of encrypted mapping subset data items; and
delivering, with a communication device, at least a first encrypted subset data item from the plurality of encrypted subset data items and at least a second subset data item from the plurality of encrypted subset data items to the at least one companion electronic device, wherein the at least a first encrypted subset data item and the at least a second encrypted subset data item are different subset encrypted data items;
further comprising delivering at least a first encrypted mapping subset data item from the plurality of encrypted mapping subset data items and at least a second encrypted mapping subset data item from the plurality of encrypted mapping subset data items to the at least one companion electronic device.

16. The method of claim 15, wherein the delivering the at least a first encrypted subset data item from the plurality of encrypted subset data items and the at least a second subset data item from the plurality of encrypted subset data items to the at least one companion electronic device occur at different times.

17. The method of claim 16, wherein the different times are selected randomly.

18. The method of claim 17, the encrypted mapping data item comprising timestamps indicating when the plurality of encrypted subset data items are delivered to the at least one companion electronic device.

19. The method of claim 15, further comprising determining, with the one or more processors, whether at least one data sharing condition for one or both of the electronic device and the at least one companion electronic device is met, and allowing, by the one or more processors, the delivering the at least a first encrypted subset data item from the plurality of encrypted subset data items and the at least a second subset data item from the plurality of encrypted subset data items to the at least one companion electronic device only when the at least one data sharing condition is met.

20. The method of claim 19, wherein the at least one data sharing condition comprises one or more of the electronic device and the companion electronic device being at a common location, the electronic device and the companion electronic device being at a known location, the electronic device and the companion electronic device being within a predefined distance from each other, or combinations thereof.

* * * * *